United States Patent
Subramanian et al.

(10) Patent No.: US 10,742,498 B2
(45) Date of Patent: Aug. 11, 2020

(54) APPLICATION MIGRATION SYSTEM

(71) Applicant: Amazon Technologies, Inc., Seattle, WA (US)

(72) Inventors: Hariharan Subramanian, Santa Clara, CA (US); David Samuel Zipkin, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 687 days.

(21) Appl. No.: 15/189,983

(22) Filed: Jun. 22, 2016

(65) Prior Publication Data
US 2017/0373935 A1    Dec. 28, 2017

(51) Int. Cl.
G06F 15/16    (2006.01)
H04L 12/24    (2006.01)
G06F 9/50    (2006.01)
G06F 9/48    (2006.01)

(52) U.S. Cl.
CPC ........ H04L 41/0816 (2013.01); G06F 9/4856 (2013.01); G06F 9/5072 (2013.01); H04L 41/0846 (2013.01); H04L 41/0889 (2013.01)

(58) Field of Classification Search
CPC .......... G06F 9/4856; G06F 2009/4557; H04L 41/0816; H04L 41/0846; H04L 41/0889
See application file for complete search history.

(56) References Cited

U.S. PATENT DOCUMENTS

| | | | | |
|---|---|---|---|---|
| 8,769,059 B1 * | 7/2014 | Chheda | ............... | H04L 41/0866 705/26.5 |
| 8,793,380 B2 * | 7/2014 | Lee | ...................... | H04L 67/1002 709/226 |
| 9,507,829 B1 * | 11/2016 | Elsaid | ................. | G06F 17/3053 |
| 2002/0194050 A1 * | 12/2002 | Nabe | ...................... | G06Q 10/06 705/7.31 |
| 2006/0146731 A1 | 7/2006 | Lewis et al. | | |
| 2007/0005746 A1 | 1/2007 | Roe et al. | | |
| 2009/0300635 A1 * | 12/2009 | Ferris | .................... | G06F 9/5072 718/104 |

(Continued)

FOREIGN PATENT DOCUMENTS

| | | |
|---|---|---|
| CN | 102377786 | 3/2012 |
| CN | 103714050 | 4/2014 |

(Continued)

OTHER PUBLICATIONS

U.S. Appl. No. 15/385,796, filed Dec. 20, 2016, Theodore Carroll, et al.

(Continued)

*Primary Examiner* — Oleg Survillo
(74) *Attorney, Agent, or Firm* — Robert C. Kowert; Kowert, Hood, Munyon, Rankin & Goetzel, P.C.

(57) ABSTRACT

At a network-accessible service, a request is received from a client to enable access by a migration facilitator to a configuration record collection of the client. A response to a migration candidate identification query is generated using the configuration record collection and transmitted to the facilitator. An indication of a proposal associated with migrating at least a portion of the client's computing environment to a different computing environment with assistance from the facilitator is provided to the client.

21 Claims, 25 Drawing Sheets

(56) References Cited

U.S. PATENT DOCUMENTS

| | | | |
|---|---|---|---|
| 2010/0131649 A1 | 5/2010 | Ferris | |
| 2013/0117219 A1 | 5/2013 | Malka et al. | |
| 2015/0341230 A1* | 11/2015 | Dave .................. | H04L 41/5058 705/7.29 |
| 2016/0034277 A1* | 2/2016 | Syed ......................... | G06F 8/76 717/136 |
| 2016/0092266 A1* | 3/2016 | Bavishi ................. | G06F 9/4856 718/1 |
| 2016/0099998 A1* | 4/2016 | Richman ............ | H04L 67/1095 709/202 |
| 2016/0162507 A1 | 6/2016 | Gupta et al. | |

FOREIGN PATENT DOCUMENTS

| | | |
|---|---|---|
| WO | 2012102863 | 8/2012 |
| WO | 2015054300 | 4/2015 |

OTHER PUBLICATIONS

CloudEndure, "Simple Migration to the Cloud with No Downtime," 2014 copyright, downloaded from https://www.cloudendure.com/cloudmigrationproduct/ on Sep. 30, 2015, pp. 1-10.

Racemi Business Systems Agility, "Cloud Migration Software—Server Migration Software," Racemi 2015, downloaded from http://www.racemi.com/ on Sep. 30, 2015, pp. 1-2.

ScienceLogic, Inc. 2015, "The ScienceLogic Platform—Complete Hybrid IT Monitoring," downloaded from https://www.sciencelogic.com/product on Sep. 30, 2015, pp. 1-14.

RISC Networks (2015), "CloudScape", downloaded from http://www.riscnetworks.com/cloudscape/ on Sep. 30, 2015, pp. 1-13.

U.S. Appl. No. 14/871,701, filed Feb. 3, 2016, Hariharan Subramanian, et al.

U.S. Appl. No. 15/189,979, filed Jun. 22, 2016, Hariharan Subramanian, et al.

U.S. Appl. No. 15/189,976, filed Jun. 22, 2016, Hariharan Subramanian, et al.

U.S. Appl. No. 15/374,520, filed Dec. 9, 2016, Akhilesh Mritunjai.

International Search Report from PCT/US2017/038653, dated Oct. 2, 2017, pp. 1-13.

Anonymous, "Record Linkage—wikipedia, the free encyclopedia," May 9, 2015, XP005327008, pp. 1-9.

\* cited by examiner

APPLICATION MIGRATION SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization (e.g., an enterprise data center), and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

A sophisticated application's execution environment may span a wide variety of resources—e.g., some components of the application may be run using a virtual machines, while others may be run using un-virtualized servers. In some cases, the resources of an application or a related set of applications may be distributed among several different data centers. The complexity of the execution environment may make it difficult to obtain a full understanding of the relationships and dependencies among various application components. Such a lack of clarity may in turn make it harder to take consequential business decisions such as migrating applications from customer-owned premises to provider network environments.

Figure 1:
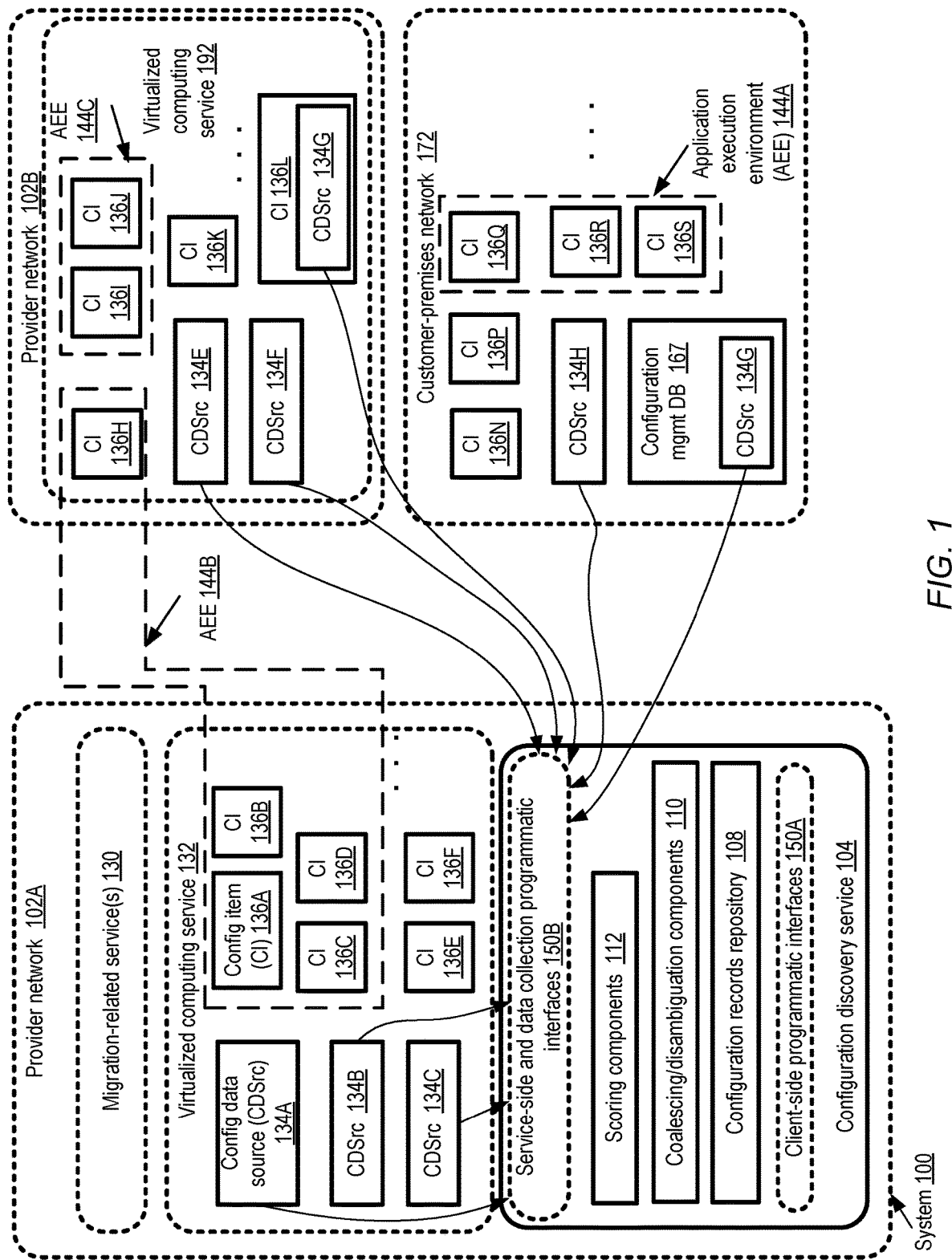
FIG. 1 illustrates an example system environment in which an intelligent configuration discovery service for multi-data-center applications may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for intelligent configuration discovery techniques implemented at a network-accessible discovery service, visualization techniques for providing automatically updated views of configuration information, and a migration marketplace service to assist customers of the discovery service as well as migration facilitators in making decisions regarding migration of applications are described. At a high level, the configuration discovery service may enable (among other features) the automated detection of configuration items (such as physical or virtualized compute servers, storage devices, databases, software stack components and the like that make up an application) and distributed application patterns based on raw data collected by a variety of data sources, the assignment of unique identifiers to configuration items, the tracking of interactions (e.g., transactions, network traffic flows etc.) and dependencies among the items, changes in application configuration over time, as well as performance monitoring at desired levels of granularity for complex application execution environments. The configuration discovery service may also be referred to as an application discovery service or as a resource discovery service in some environments, as the configuration items are the components that form an application. The configuration discovery service may implement a variety of programmatic interfaces (e.g., web service application program interfaces, command line interfaces, etc.) which can be used by service clients to obtain responses to configuration-related queries, and can also be used as building blocks by other services including the migration marketplace service and the visualization service to provide higher level functionality. In some embodiments, a visualization service affiliated with or part of the configuration discovery service may serve as one of the primary modes of interaction for clients of the configuration discovery service—e.g., a customer may be able to view customized representations of their application execution environments adapted to the particular client-side display environment being used, issue configuration-related queries via the visualization interface, and/or initiate partial or full application migrations from one set of resources to another. In various embodiments, the migration marketplace may act as an intermediary service that enables clients to identify suitable migration facilitators, and for the migration facilitators to identify candidate clients—e.g., for moving applications from client premises to cloud-based computing environments, or from one cloud-based environment to another.

In at least some embodiments, some or all of the services may be implemented at a provider network. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. It is noted that while the configuration discovery service, the visualization service and/or the migration marketplace service may be implemented within a particular provider network, some or all of these services may be authorized and granted the appropriate permissions to access information from other provider networks (e.g., from provider network run by a different business organization). For example, a configuration discovery service running at a provider network PN1 run by operator O1 may be able to gather configuration data collected from a provider network PN2 run by operator O2 (as well as from other facilities such as client-owned data centers and PN1's own data centers), a visualization service running at PN1 may enable clients to view distributed application architectures which comprise components running at PN2, and/or a migration marketplace service running at PN1 may be able to provide information about migration facilitators to clients for migrating the components running at PN2 to PN1. In some embodiments, the visualization service and/or the migration marketplace service may be implemented as subcomponents of the configuration discovery service. A configuration discovery service may also be referred to herein simply as a discovery service.

A wide variety of data sources may be employed at the configuration discovery service to build up a repository of configuration records. For example, in some embodiments, the data sources may include existing configuration management databases at client data centers (from which configuration data may sometimes be imported in bulk via programmatic interfaces), agents or configuration data collectors installed on behalf of the configuration discovery service at various resources, third-party or industry-standard configuration management tools, and so on. Each data source may provide configuration information, e.g., including some number of attribute-value pairs for some set of configuration items, to the configuration discovery service at one or more points in time. Some data sources may provide raw configuration data at regular intervals, while others may be event-driven in at least some embodiments. The configuration item attributes for which values are obtained at the service (e.g., via agents installed on behalf of the service) in various embodiments may include, among others, user information (such as user names and home directories), group information (such as group names and group membership), lists of installed software packages/programs, and lists of kernel modules. Information about a number of different types of configuration-related events, such as process creations/terminations (with associated process identifiers), Domain Name Service (DNS) queries and responses, packet sends and receives at various layers of networking stacks and so on may also be collected in at least some embodiments. Values of various attributes of the physical and/or virtual network interfaces (including for example the type of network interconnect such as Ethernet which is being used, the maximum bandwidth supported, associated media access control or MAC addresses etc.) may be collected from the devices of the targeted execution environments. The particular network ports, such as TCP (Transmission Control Protocol) or UDP (User datagram Protocol) ports being used at various resources may be identified, and TCP version 4 or version 6 connection attributes (such as the identifiers of the processes at either end of the connections, the connection establishment times, the durations for which the connections remain open, etc.) may be collected. Operating system-related attributes, including for example the specific versions of the operating system in use at various hosts and virtual machines, may be collected in some embodiments. System performance and process performance metrics may be collected at various intervals in different embodiments. In some embodiments, a plurality of agents of the discovery service may be installed at a given host or device to collect respective subsets of the configuration attribute values for one or more configuration items; in other embodiments, a single agent or tool may be able to extract attribute values from several different sources.

The configuration discovery service may act as a combiner and curator of potentially out-of-date, conflicting and/or ambiguous raw configuration information collected from various data sources at respective levels of granularity and according to respective schedules. From disparate data sources, in some embodiments the configuration discovery service may be responsible for generating and storing coalesced and curated configuration records; such coalesced records may serve as the authoritative sources of configuration data for the visualization and migration marketplace services (or other services relying on the discovery service). In at least some embodiments, the configuration discovery service may generate and assign unique service-side identifiers to respective configuration items based at least in part on an ontology defined by the service. For example, a given hardware server may be identified by one data source based on one of the server's IP addresses (which may be changed over time), by another data source based on a server name or MAC (media access control) address, by a third data source based on the role (e.g., "web server" or "database server") being played by the server in a distributed application, and so on. The data sources may each include their own respective identifiers/names for the server in the raw configuration data provided to the configuration discovery service. Such identifiers may be referred to herein as data-source-side identifiers. The configuration discovery service may examine the raw configuration data received from one or more of the different data sources, and generate a unique service-side identifier for the server based on the defined ontology and a naming scheme (which may take a subset of the raw data's attribute values into account).

The unique service-side identifier may differ from at least some of the identifiers/names used by the data sources. When a new set of raw configuration data is received or analyzed at the service, the service may be able to determine the uniquely-identified configuration item to which at least a portion of the raw data applies, despite the absence of the unique identifier in the raw data in at least some embodiments. In some embodiments, the service may be responsible for maintaining mappings between the data source-provided identifiers and the unique service-side identifiers, and for resolving ambiguities associated with such mappings (e.g., an ambiguity which may arise if the data source changes its identifier for a given configuration item). Ambiguities may be resolved using a variety of mechanisms in different embodiments—e.g., based on correlation analysis with respect to raw configuration data received from other data sources over some time periods, based on client feedback, and so on. In one example scenario, for example, two distinct unique service-side identifiers may (erroneously) be assigned to the same configuration item initially, e.g., on the basis of respective raw configuration data sets DS1 and DS2 received from two different data sources, and as a result two different coalesced configuration records R1 and R2 with respective distinct service-side identifiers may be stored in the service repository. Later, e.g., after processing one or more additional raw data sets and/or after interactions via a programmatic interface with a client, the error may be detected and corrected. That is, the service may determine that attributes for which values are stored in R2 are actually attributes of the underlying configuration item corresponding to R1. Such a determination may be made, for example, based on an analysis of resource consumption information. If the two configuration items associated with R1 and R2 are initially erroneously assumed to be different hardware servers, but collected metrics regarding CPU utilization levels or network packet outflow for the two items are found to be very similar or identical over a period of time, the records R1 and R2 may be identified as referring to the same server. Some of the information that was stored in R2 may be used to update R1 in such a scenario, and R2 may be deleted (or conversely, information in R1 may be used to modify R2 and R1 then may be deleted). In at least one embodiment, an error-correcting API may be implemented by the discovery service, enabling clients (and/or other authorized entities such as professional service analysts, consultants or partners of the provider network operator) to inform the service regarding such mistakes. The corrections provided via such an API may be used to improve service operations more broadly in various embodiments—e.g., corrections made by one authorized entity with respect to a given set of configuration data of a given service customer may be generalized and used to detect and correct potential errors made with respect to other sets of configuration data of the same customer or other customers.

In at least some embodiments, the configuration discovery service may associate respective trust scores with different data sources, and such trust scores may be used when deciding which among a set of potentially conflicting or out-of-date configuration data elements is to be accepted. The trust scores may themselves change over time—for example, if a dump of a client's configuration management database representing a client data center is obtained at the service, the initial trust score for the client's database may be set to a high value, but the score may be reduced as time passes and configuration changes occur at the client data center. Trust scores may be used when generating the coalesced configuration records from the raw configuration data in at least some embodiments—e.g., attribute values obtained from a high-trust data source may be included with a greater probability in a coalesced record than attribute values obtained from a low-trust data source. In a scenario in which an attribute value V1 from a data source DS1 with a current trust score TS1 contradicts or conflicts with an attribute value V2 from a different data source DS2 with a higher current trust score TS2, the attribute value (V2 in this case) from the source with the higher trust score may be included in the coalesced configuration record, and the attribute value from the source with the lower trust score may be excluded. In at least some embodiments, machine learning techniques may be employed to generate and update trust scores over time.

Additional details regarding various aspects of the operations of the configuration discovery service, including automated pattern-based grouping and tagging of application components, algorithms for detecting the sources of network packets received via obfuscating intermediaries, associating relevance scores to configuration items, the data models and pre-loading techniques used to increase responsiveness to queries, and the like, are provided below. The visualization service and the marketplace migration service are discussed after the details of the discovery service are discussed.

Example System Environment

FIG. 1 illustrates an example system environment in which an intelligent configuration discovery service for multi-data-center applications may be implemented, according to at least some embodiments. As shown, system 100 may comprise a plurality of provider networks, such as provider networks 102A and 102B, as well as a customer-premises network 172 in the depicted embodiment. Within each of the provider networks 102, one or more network-accessible services may be implemented by respective provider network operators. For example, provider network 102A comprises the configuration discovery service 104, a virtualized computing service 132, and one or more migration-related services 130 which may be utilized by potential customers to migrate their applications from execution environments outside provider network 102A to provider network 102A. Additional details about migration-related services are provided below. Provider network 102B may include its own virtualized computing service 192, at which a different approach towards virtualizing compute servers may be utilized than is used in virtual computing service 132—e.g., different types of hypervisors or virtualization management software stacks may be used, different sets of programmatic interfaces may be supported for acquiring and using virtual machines, and so on.

A number of distributed applications may be run on behalf of various customers using the resources of provider networks 102A and 102B and/or customer-premises network 172 in the depicted embodiment. The set of resources being used for a given application or a related set of applications may be referred to herein as an application execution environment (AEE) 144. A given AEE may comprise a wide variety of resources—e.g., virtual and/or physical compute servers, storage devices, networking devices, multi-layer software stacks and the like. At least some of the resources may comprise configuration items (CIs) 136 about which respective sets of configuration information (e.g., a collection of attribute values) is collected and stored within the configuration discovery service 104. Generally speaking, from the perspective of the configuration discovery service and its clients, a configuration item 136 may comprise any physical, virtual or logical entity whose configuration settings and/or state information may be useful for managing one or more applications, and can be obtained via programmatic interfaces by the configuration discovery service. Example configuration items may comprise, among others, a non-virtualized hardware server, a virtual machine, a software process or collection of related processes, a storage device such as a rotating magnetic disk or a solid-state drive (SSD), a network device such as a router, and so on. In some embodiments, the configuration discovery service may obtain respective data sets of configuration data about a given configuration item 136 from one or more configuration data sources (CDSrcs) 134 iteratively—e.g., at regular intervals or in response to the occurrence of specified events. In the latter scenario, the configuration data stored at the service 104 may comprise a plurality of timestamped records for the configuration item. A number of different types of configuration data collectors or sources may be employed in various embodiments, such as for example software and/or hardware agents that are installed on behalf of the configuration discovery service 104, industry-standard configuration management tools, custom configuration management tools, customer configuration management databases, and the like.

Some AEEs, such as AEE 144A or AEE 144C, may comprise resources within the boundaries of a given network. AEE 144A comprises configuration items 136Q, 136R and 136S of customer-premises network 172, while AEE 144C comprises configuration items 136I and 136J of provider network 102B. Other AEEs may comprise configuration items distributed among multiple networks and/or data centers. For example, AEE 144B comprises configuration items 136A-136D of provider network 102A, as well as configuration item 136H of provider network 102B. It is noted that over the course of time, at least in some embodiments the mappings between an AEE 144 and the networks at which configuration items of the AEE are located may change—e.g., one or more configuration items may be migrated to a different provider network, from a customer-premises network to a provider network or from a provider network to a customer-premises network.

In the depicted embodiment, each network may comprise a plurality of configuration data sources 134, which may communicate with the configuration discovery service 104. For example, provider network 102A comprises configuration data sources 134A-134C, collectively responsible for obtaining and transmitting configuration data sets for configuration items 136A-136F to the service 104. Similarly, provider network 102B comprises data sources 134E-134G responsible for reporting on configuration items 136H-136L, while customer-premises network 172 comprises data sources 134H and 134I responsible for transmitting configuration data sets pertaining to configuration items 136N and 136P-136S to service 104. In some cases, a given configuration data source 134 may be responsible for collecting configuration data pertaining to a plurality of configuration items 136, while in other cases a configuration data source 134 may report on a single configuration item 136. At least for some configuration items 136, configuration data sets may be collected by a plurality of configuration data sources 134—e.g., at respective levels of granularity and/or at respective layers of the software/hardware stack. In some embodiments, a given configuration data source 134 may be a subcomponent of a configuration item 136—e.g., as a process or thread of execution running at a server which represents the configuration item. For example, data source 134G is shown as part of configuration item 136L. Some configuration data sources may comprise subcomponents of existing configuration management tools—e.g., in the depicted embodiment, a customer's configuration management database 167 comprises a data source 134G reporting to the service 104.

The configuration discovery service 104 may implement one or more sets of programmatic interfaces 150 in the depicted embodiment, any of which may comprise for example application programming interfaces (APIs), web-based consoles, command-line tools and/or graphical user interfaces. The client-facing programmatic interfaces 150A may, for example, be used by customers to identify and/or grant configuration data gathering permissions associated with their application execution environments 144, to view configuration information collected by service 104 (e.g., using a visualization service as discussed below in further detail), to obtain notifications regarding events or conditions which may require client feedback, and so on. A set of data collection and/or service-side programmatic interfaces 150B may be used for interactions between configuration data sources 134 and the service 104, as well as for building additional features by migration-related services 130 and/or other services using the collected configuration data of service 104 in the depicted embodiment.

The configuration discovery service 104 may comprise several subcomponents in the depicted embodiment, such as a configuration records repository 108, components 110 responsible for coalescing/disambiguating raw configuration data, and/or one or more scoring components 112 responsible for assigning/modifying respective trust scores to data sources 134 and/or assigning/modifying relevance scores to configuration records as discussed below. In at least some embodiments, the service may comprise a number of data stores with different performance capabilities and/or data models as discussed below—e.g., configuration records may be pre-loaded into low-latency caches from a central repository 108 to increase responsiveness to expected types of queries.

The configuration data sources 134 may provide raw configuration data sets in a variety of formats and at different intervals to the configuration discovery service 104 in the depicted embodiment. In some cases, the raw data received at service 104 with respect to one or more configuration items 136 may be stale or out-of-date or inaccurate. Furthermore, the manner in which the configuration items are identified in the raw data sets provided by the different data sources 134 may in some cases be inconsistent—e.g., if a given hardware server configuration item has a plurality of IP addresses, the server may be referred to using different IP addresses by different configuration data sources, or by name or location (such as "server 5 of rack R1 in room 3 of data center DC1") by other data sources. The configuration discovery service 104 may be responsible for consolidating, disambiguating and curating the raw configuration data sets using a variety of techniques in the depicted embodiment. In one such technique, when a set of raw configuration data is received, the service 104 may attempt to discern whether the data refers to a known configuration item 136 (an item for which configuration data has been received and recorded previously at the service). If the newly-received data does not appear to correspond to a known configuration item, a naming scheme or algorithm may be used to generate a unique service-side identifier for the configuration item to which the raw data corresponds, based at least in part on an ontology defined at the service 104 and/or on one or more attribute values of the configuration item which are indicated in the raw data. The unique service-side identifier may, at least in some implementations, differ from the identifier used by the data source in the raw data set. In effect, in such implementations, the service 104 may be responsible for maintaining mappings between data source-reported identifiers and the unique service-side identifiers. When subsequent raw data sets are received at the service, in some embodiments the coalescing/disambiguating components 110 may utilize such mappings and/or use correlations of the raw configuration data with previously-seen data to identify the configuration item to which the raw data sets apply. In some embodiments, the service-side identifier assigned to a given configuration item 136 may be unique within the entire collection of configuration records stored at the service 104, while in other embodiments, the identifier may be unique within a particular configuration domain or namespace (e.g., a domain or namespace associated with a given customer).

The manner in which available configuration data about a configuration item is analyzed and used to generate a unique service-side identifier may differ in different embodiments. In one embodiment, the raw configuration data, which may be provided in XML (Extensible Markup Language), JSON (JavaScript Object Notation), plain text or a binary format such as CBOR (Concise Binary Object Representation) by different data sources, may first be parsed and normalized into a common format. A search for attribute values provided for keywords (such as "IPAddr" for Internet Protocol Address or "MACAddr" for median access control addresses) that are associated with uniqueness within some namespace may be performed in the raw or normalized data, and the results of the search may be combined/concatenated with object type names (e.g., "database server" or "virtualization host") to generate the unique service-side identifier (e.g., "DBServer.<DBVendorName>.<IP address>"). In one embodiment, a machine learning technique may be used to improve the process of generating unique service-side names for configuration items. For example, a machine learning model for generating the identifiers may be trained using a large anonymized configuration data set collected from various components of a virtualized computing service of a provider network (e.g., the same provider network at which the configuration discovery service runs). Some of the naming decisions made by early versions of the model may be erroneous—e.g., the same underlying configuration item may be given two different unique identifiers, or two configuration items may be given the same identifier. Over time, as the model training progresses with larger input data sets, the error rate may be reduced.

In at least some embodiments, respective trust scores may be assigned (e.g., by scoring components 112) to respective configuration data sources 134, and used to decide, in effect, which of two potentially conflicting sources is likely to be more accurate at a given point in time. For example, some of the data sources may comprise agents of discovery service 104, which may have been designed, developed and tested by personnel of the operator of provider network 102B before being installed, while the origins and/or testing levels associated with other data sources may be less well-known. In the latter scenario, a higher trust score may sometimes be assigned to the more familiar or better-understood data sources. In some embodiments, a trust score of a given data source may vary based on the attribute whose value is being considered, or the level of the software/hardware stack at which the attribute value was generated For example, data sources DS1 and DS2 may each be providing respective metrics C1 and C2 regarding CPU usage of a given program or process. If DS1 collects its version of CPU utilization measurements C1 at a hypervisor layer, while DS2 collects its version C2 using a tool provided by the operating system, different trust scores may be assigned to the CPU usage attribute values from the two sources. In at least some embodiments in which multiple data sources may provide respective values for the same attribute, each data source (or {data source, attribute} pair)

may be assigned a respective weight indicative of a current trust level, and the weights may be used to determine the final value of the attributes to be used and saved by the discovery service. In one embodiment, if and when two different raw data sets corresponding to the same configuration item 136 are received from respective data source 134, and at least one attribute value of one raw data set conflicts with or contradicts an attribute value indicated in the other, a coalesced configuration record which excludes the conflicting attribute value of the data source with the lower trust score may be generated and stored in repository 108. The trust scores for different data sources 134 may be time-weighted in some embodiments—e.g., if raw configuration data was collected at time T1 by one data source CDSrc1 and apparently-conflicting raw data was collected at time T2 (where T2 is later than T1) by another data source CDSrc2, the more recently-collected raw data may be considered more trustworthy. The coalesced data records generated by coalescing/disambiguating components 110 may be used to provide responses to configuration queries received via programmatic interfaces 150A and/or 150B (e.g., either from customers or from other services of provider network 102A) in various embodiments.

In addition to curating or consolidating raw configuration data received from the data sources 134, in at least some embodiments components of the discovery service 104 may perform a number of other functions, such as automatically identifying groups of configuration items which together correspond to a distributed application pattern, assigning roles within such groups to respective configuration items, implementing traffic source detection algorithms for network traffic whose sources may have been obfuscated by intermediary devices, proactively preparing configuration data to support high-performance querying, and so on. Additional details about these and other functions are provided below.

Figure 2:
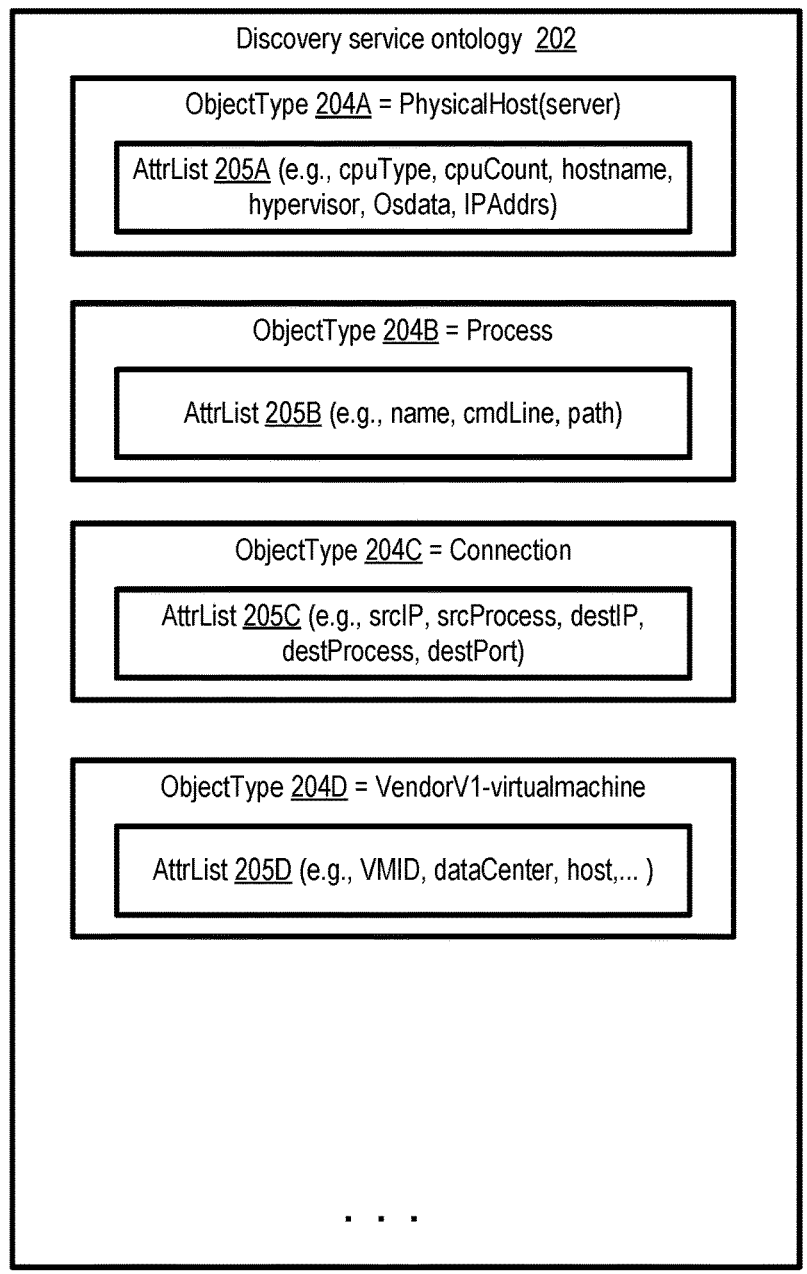
FIG. 2 illustrates example components of a discovery service ontology which may be used to organize configuration information, according to at least some embodiments.

As mentioned earlier, in at least some embodiments the configuration discovery service may define and utilize an ontology of configuration items. FIG. 2 illustrates example components of a discovery service ontology which may be used to organize configuration information, according to at least some embodiments. The ontology 202 may comprise a plurality of object types, and a list of one or more attributes corresponding to each object type in the depicted embodiments. Respective values for at least some of the attributes of a given attribute list for a given configuration item may be included in the raw configuration data sets transmitted to the configuration discovery service by various configuration data sources. The ontology and the raw attribute values may be use to generate unique service-side identifiers for configuration items in various embodiments. For example, a unique service-side identifier for a configuration item may be constructed by concatenating several attribute values (some of which may be obtained from different data sources) with a service-generated text identifier prefix in some embodiments.

Object type 204A, for example, corresponds to a physical host or server. The corresponding attribute list 205A may include the CPU type, the count of CPUs or cores, the currently-assigned host name, the hypervisor (if any is installed), various elements of operating system information (OSdata), one or more IP addresses, and the like. The value of a given attribute of an attribute list such as 205A may itself comprise several distinct elements of data—e.g., the "CPU type" attribute may include information about the instruction set architecture supported by the CPU, the CPU vendor, the CPU's clock frequency, model name and so on.

Object type 204B represents a process (i.e., a unit of execution at a server). Attribute lost 205B for the process may include, among others, the name of the process, the command line used to invoke the process, the path (e.g., directory path or folder path) at a host's operating system corresponding to the location of the executable used for the process and/or to the home directory of the process, the number of threads of the process, and so on.

Object type 204C represents a network connection (assumed to be established using the Transmission Control Protocol/Internet Protocol or TCP/IP suite in this example). Attribute list 205C comprises the source and destination IP addresses (srcIP and destIP respectively) (e.g., with the source being identified as the endpoint which issued the connect( ) call to establish the connection), the source and destination process identifiers (srcProcess and destProcess respectively) and/or the destination port (destPort).

Object type 204D corresponds to a virtual machine generated using a virtualization framework obtained from a particular technology vendor V1. The attribute list 205D for the virtual machine includes a vendor-defined virtual machine identifier (VMID), an identifier of the data center at which the virtual machine is running or has run, and the host at which the virtual machine is currently running, is scheduled to run, or has run.

A number of other object types may be defined in the ontology 202 in various embodiments. For example, respective object types may be defined for storage devices, entities such as database instances, networking device such as load balancers/routers etc. and the like in some embodiments. In one embodiment, respective object types may be defined for geographical or other groupings of resources—e.g., a data center may have its own object type, or a server rack may have its own object type. In some embodiments, the ontology may define hierarchical or containment relationships among various objects—for example, a number of processes may be running at a given host and may therefore be contained within the host, a master process of an application may spawn various other processes which may be designated as child processes of the master, and so on. Relationships among various entities of the ontology may be defined in an object-oriented manner in at least some implementations.

Coalesced and Curated Configuration Records

Figure 3:
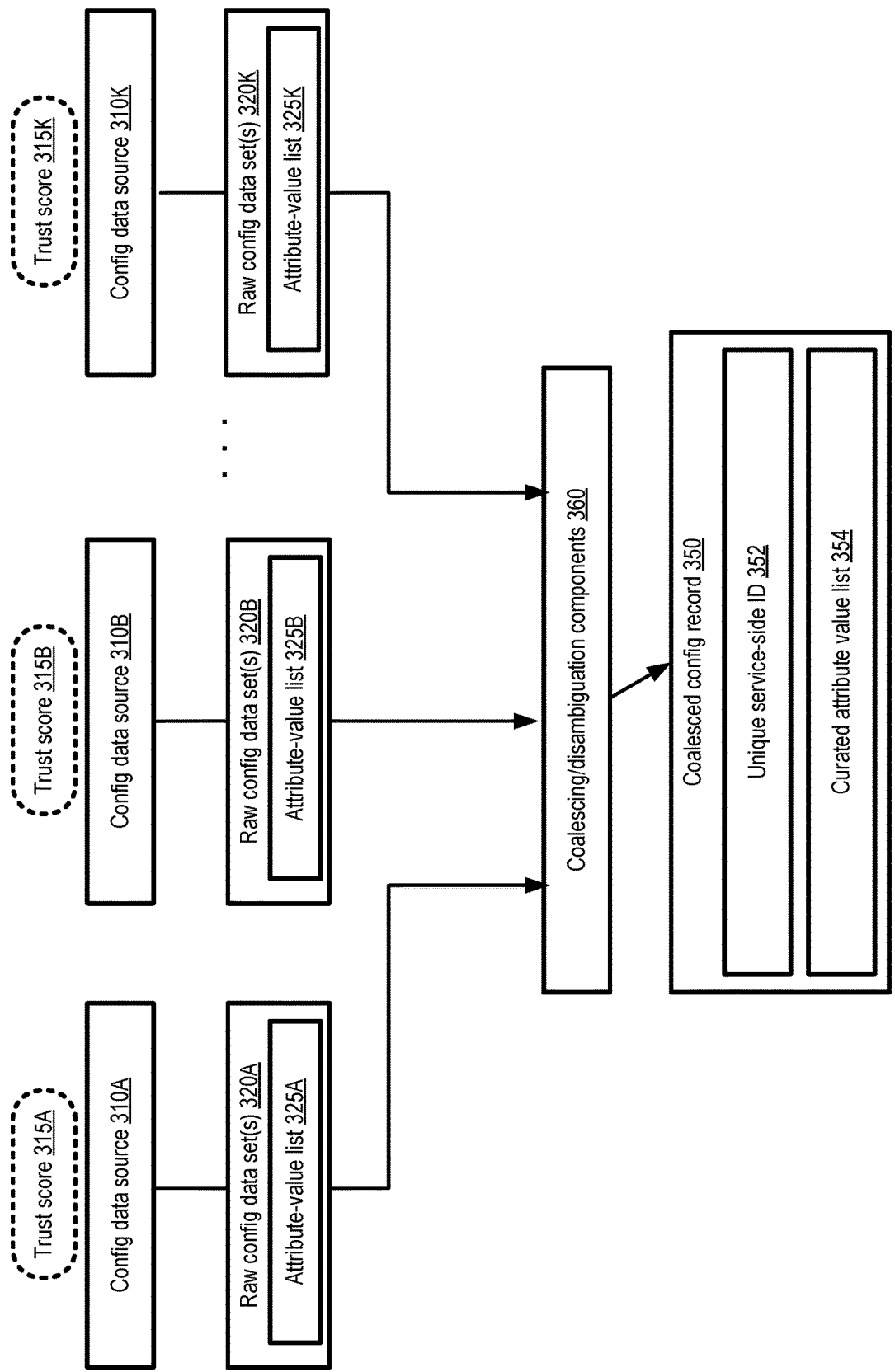
FIG. 3 illustrates an example of coalescing raw configuration information from a plurality of data sources with respective trust scores to produce a curated attribute-value list, according to at least some embodiments.

FIG. 3 illustrates an example of coalescing raw configuration information from a plurality of data sources with respective trust scores to produce a curated attribute-value list, according to at least some embodiments. In the depicted embodiment, a plurality of raw configuration data sets 320, including data sets 320A, 320B, and 320K pertaining to a given configuration item are transmitted to a discovery service by respective data sources 310 (e.g., data sources 310A, 310B and 310K). Each raw configuration data set 320 comprises a respective attribute value list 325. For a given host, for example, the attributes and their corresponding values may include "Name:Host100", "IP Address:a.b.c.d", "operating system: <OSVersion>" and so on. Not all the attribute values may necessarily correspond to a single configuration item in at least some embodiments—e.g., one or more of the configuration data sources may be reporting on a plurality of configuration items. Different data sets 320 may represent different levels of granularity—for example, one data set may include application-level information such as the number of database transactions issued or received, while another may include lower-level details such as the number of network packets transmitted or received. Some of the raw configuration data sent by two different data sources may correspond to different times—e.g., data set 320A may have been collected at a different time than data set 320K. In some cases, two or more of the attribute values pertaining to a given configuration item may conflict with one another— for example, it may be the case that one data set indicates that a particular process with a process identifier PID1 at one host H1 was responsible for communicating with a different host, while another data set may indicate that a process with another process identifier PID2 was responsible for such communications. In some embodiments, at least some of the configuration data sources may generate respective identifiers for the configuration items for which they provide data to the discovery service, and include these identifiers in data sets 320. Such identifiers may be referred to as data-source-side identifiers to distinguish them from the identifiers generated by the discovery service. Two data sources may sometimes refer to the same underlying configuration item using distinct data-source-side identifiers—e.g., one data source may refer to a host by name (e.g., "hostK.<domainname>"), another may refer to the same host by IP address, and another by function (e.g., "database server DBS1").

The coalescing/disambiguating components 360 of the configuration discovery service may examine and process all the raw configuration data sets 320 and update (or create) a respective coalesced configuration record 350 corresponding to one or more configuration items whose raw data is included in the data sets 320 in the depicted embodiment. An algorithm that may be used to coalesce two raw configuration data sets from two different sources may comprise at least some of the following steps in one embodiment. First, a decision as to whether each of the data sets comprises attribute values pertaining to the same type of configuration item (such as host, process, virtual machine etc., which are defined as ObjectTypes in the ontology 202 of FIG. 2) may be made. In order to do so, in some embodiments the attribute names may be compared to the attribute lists (e.g., AttrLists 205 of FIG. 2) defined for various configuration items in the discovery service's ontology. The attribute lists may indicate synonyms in some cases—e.g., the same attribute name be identified via name AttrName1 by one data source and AttrName2 by another data source. If it is determined that both data sets contain at least some attribute values pertaining to the same configuration item type, those <attribute:value> pairs may be examined for correlations, matches or duplications. For example, if both data sets indicate that (a) the CPU utilization at a host was approximately 75% during a particular time interval, (b) and that 2500 UDP packets were sent during the time interval from that host, this might be interpreted as an indication that the data sets are referring to the same host, even if different data-source side identifiers were used for the same host. If such a match is detected (with some minimum confidence level), a decision to create a single coalesced record for the host may be taken; otherwise, the two data sets may be deemed to refer to two different hosts and separate coalesced records may be generated. Within the single coalesced record, some subset of the <attribute:value> pairs taken from one or both the data sets may be incorporated. For example, redundant/duplicated attribute values may be discarded, some attribute values may not be included in the coalesced record because the information they contain is deducible from other attribute values that are included, or because a more accurate data source for the same data is known. Depending on the kind of data included in the data sets, in some cases one or more elements or attribute values of an existing coalesced configuration record may be updated (or new attributes added to an existing coalesced configuration record) instead of generating a new coalesced configuration record.

The coalesced configuration record 350 may often provide a more complete characterization of the configuration item than would have been possible from any single raw configuration data set 320. A coalesced configuration record 350 may include a unique service-side identifier 352 for the configuration item, which may differ from respective data-source-side identifiers indicated in the raw data sets 320 in the depicted embodiment, and may be generated based at least in part on the configuration discovery service's ontology and/or on elements of the raw configuration data sets. In at least some embodiments, a coalesced configuration record 350 may comprise a curated attribute value list 354 which may not necessarily include the union of all the attribute value lists 325 pertaining to the configuration item. Instead, for example, the coalescing/disambiguation components may discard some attribute values from one or more data sources because the values are stale (e.g., because the values have been superseded by newer values for the same underlying attributes obtained from other sources, or simply because the difference between the time that the values were collected and the time that the values are being processed exceeds a threshold). In some embodiments, respective trust scores 315 (e.g., scores 315A-315K) of the different data sources may also or instead be used to determine whether a given attribute value is to be included in the coalesced configuration record. The trust scores may be especially useful when two different data sources provide raw data corresponding to the same attribute: in such a scenario, the attribute value provided by the source with the higher trust score may take precedence. In some embodiments in which each raw data set 320 has an associated timestamp indicating when the data was collected, a formula which takes both the timestamps and the trust scores into account (in effect, resulting in time-weighted trust scores) may be used to select which attributes should be included in the curated attributed value list 354.

In some embodiments, if and when the configuration item to which a given item or items within a raw data set 320 pertain is unclear, the coalescing/disambiguating components 360 of the configuration discovery service may utilize a pattern-matching approach to identify the configuration item. For example, consider a simple scenario in which raw data set 320B and 320K both report on approximate outbound network traffic over a given time interval for some configuration item, and that data set 320B includes a host name of the configuration item but data set 320K does not. In this trivial example scenario, the coalescing/disambiguating components 360 may attempt to find attribute values contained in data set 320K which match attribute values in other data sets for similar time periods. If the outbound network traffic rates match between data sets 320K and 320B to some threshold level of precision or accuracy, the two data sets (in the absence of any contradicting evidence) may be assumed to refer to the same underlying configuration item.

Figure 4:
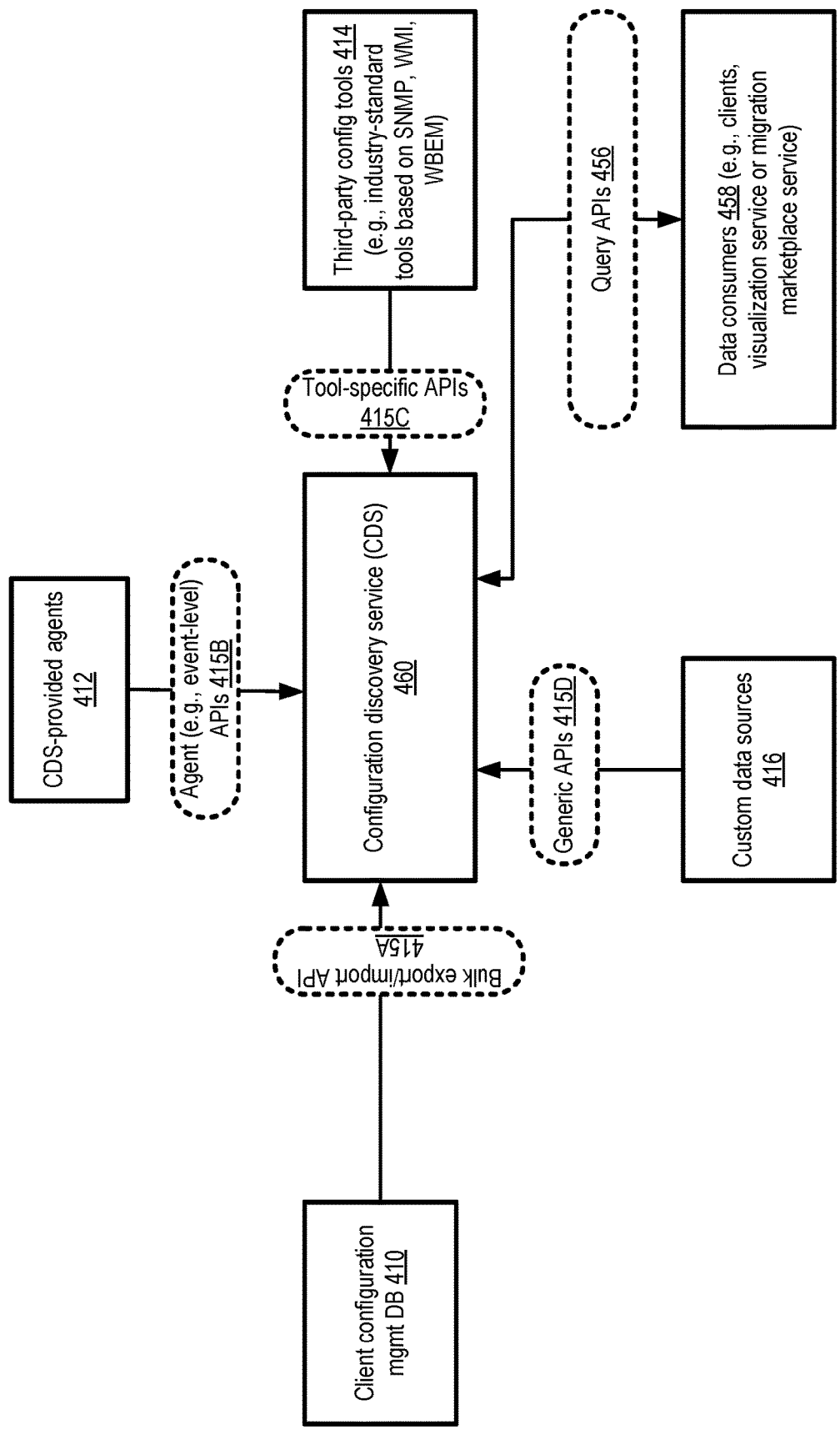
FIG. 4 illustrates example application programming interfaces which may be implemented at a configuration discovery service, according to at least some embodiments.

As mentioned earlier, a variety of programmatic interfaces may be used at the configuration discovery service in various embodiments. FIG. 4 illustrates example application programming interfaces which may be implemented at a configuration discovery service, according to at least some embodiments. Four examples of configuration data ingestion interfaces (used for providing raw configuration data sets to the service) are shown, and one example of a configuration data consumption interface (used for obtaining responses to queries directed at the service) are shown.

In at least one embodiment, the configuration discovery service 460 may provide a bulk import/export application programming interface (API) 415A which may, for example, be used to transfer large amounts of information from a client's configuration management database 410 to the service. In at least some embodiments, the service may provide (e.g., via download) a number of different software agents 412 which may be installed at various physical or virtual devices from which configuration data is to be obtained. Such agents may use agent APIs 415B to communicate with the service. In various embodiments, at least some of the agents 412 may collect data with respect to particular events (e.g., once every X seconds, a CPU utilization collection event may be scheduled at a server), and as a result the amount of data transmitted at one time via the agent's API 415B may be relatively small compared to the amount of data transferred over an export/import API 415A.

In some embodiments, the configuration discovery service may accept raw configuration data from a variety of configuration tools 414, including for example tools that utilize Simple Network Management Protocol (SNMP), Windows Management Instrumentation (WMI), or WBEM (Web-Based Enterprise Management). Tool-specific APIs 415C may be implemented for interactions between such tools and the configuration service discovery. Generic reporting APIs 415D may also be implemented for custom data sources 416 (i.e., data sources which are not agents per se, are not associated with third-party configuration tools and are not affiliated with client configuration management databases) which may be developed and deployed in some embodiments.

A number of different query APIs 416 may be implemented for entities which consume the coalesced configuration information of the discovery service. Such entities may include other services of a provider network, such as a visualization service and/or one or more migration-related services including a migration marketplace service or a migration planning service, as well as customers of the provider network at which the configuration discovery service. Some query APIs 416 may utilize variants of well-known query languages such as Structured Query Language (SQL). In one embodiment, a time series-oriented query language such as the language supported by OpenTSDB may be used for temporal configuration-related queries.

Pattern-Based Grouping and Role Assignments

Figure 5:
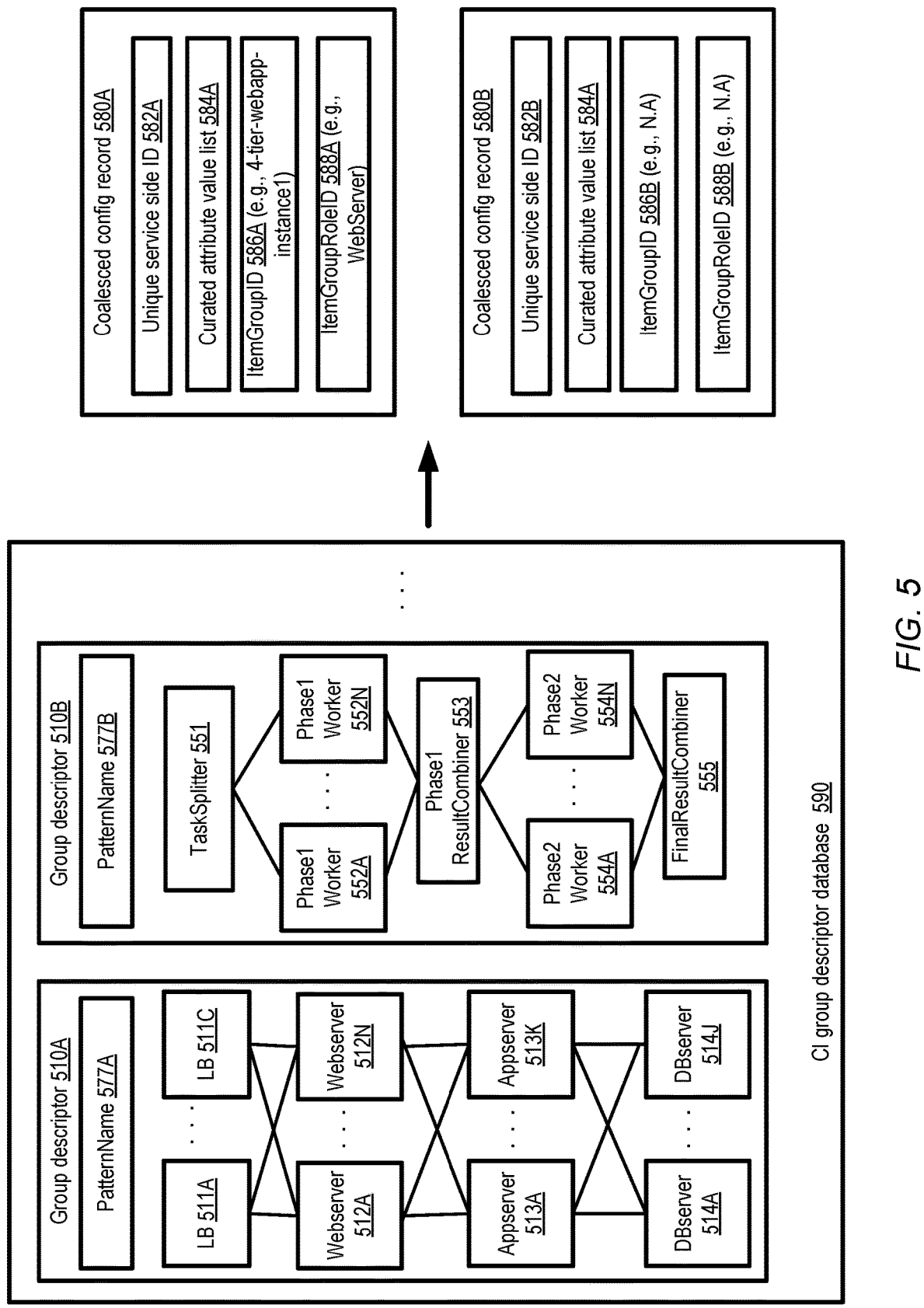
FIG. 5 illustrates examples of application architecture patterns that may be used at a discovery service to automatically detect the roles played by configuration items, according to at least some embodiments.

FIG. 5 illustrates examples of application architecture patterns that may be used at a discovery service to automatically detect the roles played by configuration items, according to at least some embodiments. In various embodiments, the service may support queries to search on application, software, and/or hardware configuration patterns which are used to group configuration items. In the depicted embodiment, a configuration item group descriptor database 590 of the configuration discovery service may comprise a number of group descriptors 510, such as 510A or 510B. Each group descriptor 510 may include a respective pattern name 577 (e.g., 577A or 577B), such as "Three-tier web application" or "Phased split-and-combine application", as well as a representation of the relationships between various entities which collectively implement an application or a related set of applications.

Each entity may play a specific logical role within the application pattern, and the communication behavior expected to be exhibited by the entities assigned different roles may be indicated in the group descriptor 510. For example, group descriptor 510A defines four roles: a load balancer (LB) role 511, a web server role 512, an application server (Appserver) role 513, and a database server (DBserver) role 514. One or more load balancers such as 511A-511C may interact via network packets with one or more web servers such as 512A-512N in an instance of a group of configuration items corresponding to descriptor 510A. Each of the web servers 512 may also interact with one or more application servers 513 (e.g., 513A-513K), and each application server in turn may also interact with one or back-end database servers such as 514A-514J. In group descriptor 510B, the roles may include a TaskSplitter 551 responsible for subdividing a task into subtasks, Phase 1 workers 552 responsible for executing the subtasks, Phase 1 ResultCombiners 553 responsible for collecting the results of phase 1 tasks and partitioning the results for phase 2 analysis, Phase 2 workers 554 responsible for analyzing the partitioned results, and a FinalResultCombiner 555 which gathers the results of the phase 2 analysis. The specific numbers of the configuration items corresponding to at least some roles may differ from one group instance to another. For example, although a single TaskSplitter, Phase 1 ResultCombiner and FinalResultCombiner entity may be instantiated within a configuration item group corresponding to descriptor 510B, the numbers of configuration items configured as Phase 1 workers or Phase 2 workers may vary from one implementation example of the descriptor to another.

In some embodiments, clients of the discovery service may submit representations of descriptors 510 to the service via programmatic interfaces, and the service may identify corresponding examples of configuration items that exhibit the patterns indicated in the descriptors. A given descriptor 510 may comprise indications of various aspects of a distributed application, such as an expected interconnection topology of configuration items associated with the application, an expected item name list (e.g., process names or paths) associated with the application, and/or an expected pattern of communication (e.g., the exchanges of packets representing a particular type of request-response behavior or an initialization/termination handshake procedure) between a pair of configuration items associated with the application. The service may try to match the observed behavior of various configuration items to the descriptor elements to determine the roles being played by the configuration items. For example, in the embodiment depicted in FIG. 5, using the collected configuration data from various data sources, the service may have determined that the configuration item with unique service-side identifier 582A, represented by the coalesced configuration record 580A, is playing the role (e.g., a Web server role) indicated by ItemGroupRoleID 588A within a particular instance of one of the group templates identified by ItemGroupID 586A (e.g., instance 1 of a four tier web application). Other configuration items, such as the item represented by coalesced configuration record 580B, may not necessarily be playing roles associated with any given pattern or group descriptor; the fields ItemGroupRoleID and ItemGroupID for such configuration items may be set to null in the depicted embodiment. The labels used for the ItemGroupRoleID and ItemGroupID may be used as "tags" to refer to multiple configuration items playing the same roles or exhibiting the same behavior patterns in some embodiments. Such tags may be used to identify the operands for various operations requested by clients of the discovery service—e.g., the logical equivalent of the query "list all configuration items in data center DC1 with tag 'Web server'" or the command "initiate automated migration of configuration items in data center DC1 with tag 'DBserver' to data center DC2" may be issued by a client. Clients may designate tags for various configuration items programmatically in some embodiments, and such tags may be used by the discovery service to then identify larger patterns or group descriptors. In one embodiment, the patterns and/or tags indicated by one customer of the discovery service may be used (e.g., with the permission of the customer who provided the patterns/tags) by the discovery service for grouping and assigning roles among the configuration items of other customers.

Automated Detection of Obfuscated Network Traffic Sources

Figure 6:
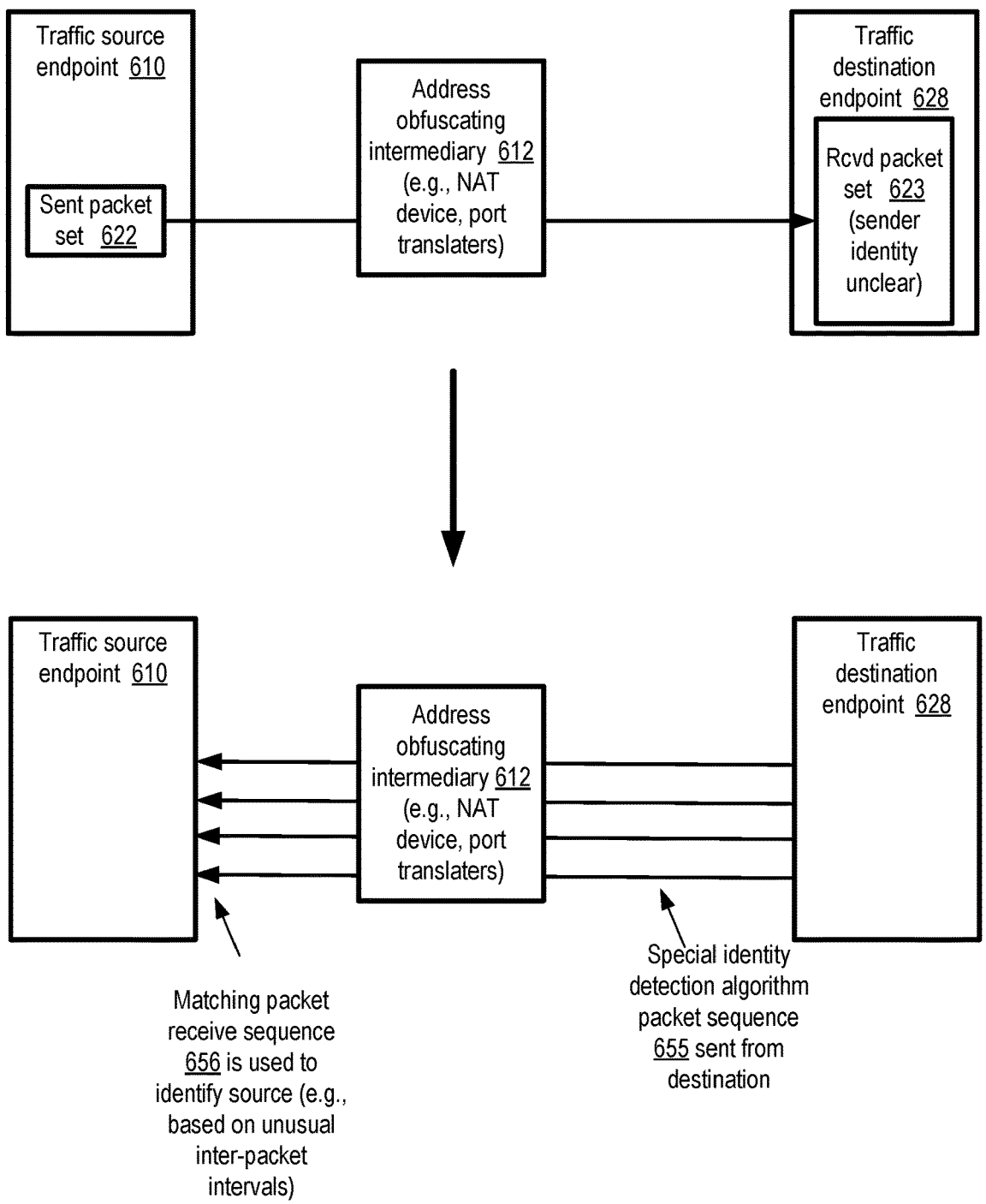
FIG. 6 illustrates the use of source identity detection algorithms for network packets at a configuration discovery service, according to at least some embodiments.

In many applications, networking intermediaries such as network address translation (NAT) devices, port translation devices and the like may sometimes modify network packets in such a way that the true source of a given packet may not be immediately detectable to configuration data sources associated with the destinations of those packets. FIG. 6 illustrates the use of source identity detection algorithms for network packets at a configuration discovery service, according to at least some embodiments. Such source identity detection algorithms may also be referred to as source endpoint detection algorithms herein. As shown, a packet set 622 from a traffic source endpoint 610 (which may be representable in the discovery service as a configuration item) may be sent to a traffic destination endpoint 628 via one or more address-obfuscating intermediaries 612 in the depicted embodiment. The address-obfuscating intermediaries may also be used for traffic in the reverse direction, e.g., from endpoint 628 to endpoint 610. Both the destination and source endpoints may have one or more configuration data sources associated with them, responsible for transmitting configuration data to the discovery service. However, because of the obfuscation operations (e.g., packet header changes, encapsulation within enveloping packets, or the like) performed by the intermediary or intermediaries 612, the identity of the sender of a received packet set 623 (which correspond to sent packet set 622) may be unclear to the data source(s) affiliated with destination endpoint 628. From the perspective of the customer on whose behalf the discovery service is being used at the endpoints 610 and 628, or from the perspective of another service (e.g., a migration-related service) which obtains configuration information pertaining to one or both endpoints, discovering the identity of the sender may be important.

Any of a number of techniques may be employed by the discovery service to identify the sender endpoint of received packet set 623. In at least one embodiment, in which respective data sources to which commands can be issued from the service are running at the two endpoints, a special packet sequence 655 may be issued from endpoint 628 to endpoint 610 via the obfuscating intermediary or intermediaries 612 as part of the endpoint detection algorithm. For example, N "extra" packets (not part of the normal application traffic) spaced exactly T milliseconds apart may be issued in packet sequence 655 by the data source associated with endpoint 628, and the data sources at various other endpoints including endpoint 610 may in effect monitor incoming traffic for such exactly-spaced packets. Assuming that there are no networking bottlenecks or problems along the path between the endpoints, it may be possible for the data source at the endpoint 610 to match the inter-arrival times of the received extra packets with the inter-transmission times of the data source at endpoint 628, thereby establishing the identity of the sender of packet set 623 with a reasonably high probability. In some embodiments, while the IP addresses and/or ports of various packets may be obfuscated at intermediaries 612, sequence numbers of the packets may not be modified, and the sequence numbers of packets may be analyzed for matches at the receiver's and sender's data sources to identify the source of the packets in the endpoint detection algorithm. In one embodiment, a sequence of connection establishment requests followed quickly by connection teardown requests may be issued from the endpoint 628 to endpoint 610, and such unusual patterns of administrative requests may be used to identify packet sources in the endpoint detection algorithm. In one embodiment, a data source such as a service agent running at the endpoint 628 may issue a request for a service-side unique service-side identifier to a data source (such as another service agent) running at endpoint 610, and the unique service-side identifier may be used to identify the sender. Regardless of the specific endpoint detection algorithm employed to detect the sender, a coalesced configuration record indicating the identity of the sender may be updated in various embodiments after the sender has been identified.

Relevance Scores

Figure 7:
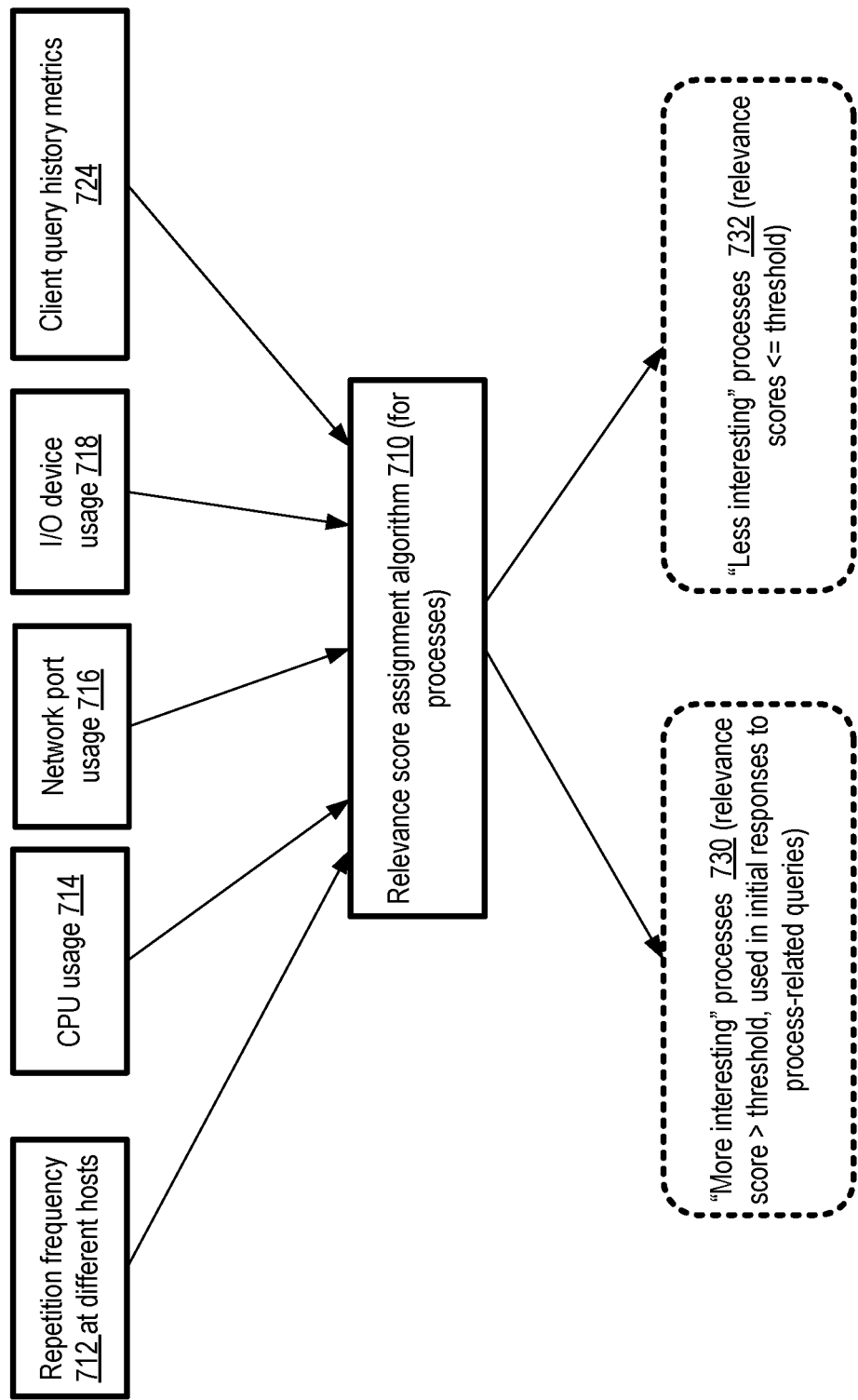
FIG. 7 illustrates example factors that may be used at a configuration discovery service to assign relevance scores to configuration items, according to at least some embodiments.

FIG. 7 illustrates example factors that may be used at a configuration discovery service to assign relevance scores to configuration items, according to at least some embodiments. The relevance scores may be used to determine at least the initial responses to queries directed at the configuration items—e.g., the responses to general queries such as "list the processes running at host H1" may comprise the processes to which relevance scores above a threshold have been assigned, thereby reducing the total size of the responses and avoiding noisy or low-information responses. Although the specific example factors shown in FIG. 7 apply to processes, a similar approach may be taken with respect to other types of configuration items as well in various embodiments.

A given physical or virtualized compute server may comprise hundreds of processes, including many low-level or background processes which typically do not consume many resources and are used (e.g., at the operating system level or kernel level) to perform background tasks or respond to unusual situations. Many such processes may be present at all the instances of a given version operating system—e.g., in an execution environment comprising fifty Linux servers, a similar set of daemon processes may be running at all fifty servers. At least some consumers of the configuration service's data may be more interested in the processes which are application-specific and therefore do not necessarily show up in the process lists of every server by default. The configuration service may therefore take the repetition frequency 712 of a given frequency at different hosts or servers into account in its relevance score assignment algorithm 710, with those processes that run at every host (or at almost every host) being assigned a lower relevance. Resource usage levels of the process, such as recent CPU usage 714, network port usage 716 (e.g., whether the process is transmitting or receiving traffic via one or more network ports) and/or I/O device usage 718 may each be positively correlated with relevance scores in the depicted embodiment—e.g., those processes which tend to consume very low levels of resources and/or are disconnected from the network may be considered low-relevance. In at least some embodiments, the configuration discovery service may keep track of the number of queries (e.g., either from a given client, a collection of clients, or all clients/consumers) which specifically target a given kind of process (e.g., queries which are directed to processes named "httpd"). The query history metrics 724 may also be used to determine the relevance of a process—e.g., if there has been a query directed specifically to a process by name or role within the previous X days, a high relevance score may be assigned to the process.

In the depicted embodiment, the relevance scores generated by algorithm 710 may be used to classify or rank the processes into at least two categories—"more interesting" processes 730 with scores higher than a selected threshold, and "less interesting" processes 732 with scores less than or equal to the threshold in the depicted embodiment. Unless a given process-related query specifies that all processes are to be included in a response, or specifically requests information about a particular query which happens to be classified as a "less interesting" process, the list of more interesting processes may be used to prepare the query response in the depicted embodiment. Similar heuristic approaches may be used to cleanse or shorten responses to queries regarding other types of configuration items in at least some embodiments. In various embodiments the scoring components 112 illustrated in FIG. 1 may utilize machine learning techniques to generate relevance scores, trust scores and the like.

Improving Configuration Query Performance

Figure 8:
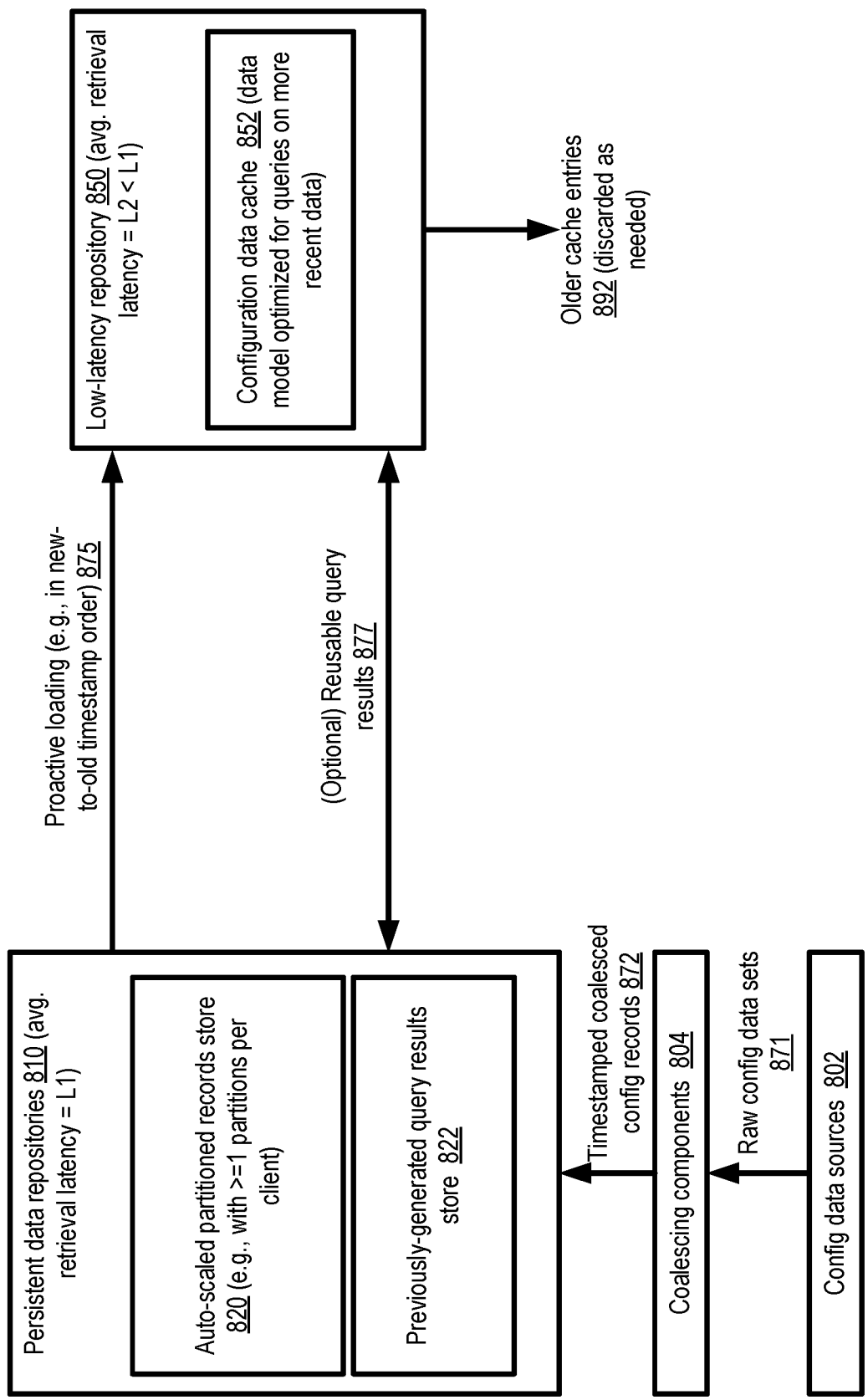
FIG. 8 illustrates on overview of techniques which may be employed at a configuration discovery service to improve responsiveness to temporal queries, according to at least some embodiments.

Many customers of the discovery service may have large application execution environments, potentially comprising thousands of configuration items distributed among a number of data centers. Recent changes to the configurations of the application components, and/or recent trends in performance or behaviors of the application components, may often be of greater interest to such customers than older configuration data. Over time, the total volume of configuration data collected and stored at the discovery service for a given application execution environment may become extremely large, potentially slowing query responsiveness, especially for temporal queries for which some traditional data models may not be optimized. FIG. 8 illustrates on overview of techniques which may be employed at a configuration discovery service to improve responsiveness to temporal queries, according to at least some embodiments.

Raw configuration data sets 871 obtained by the data sources 802 may be used at the coalescing components 804 of the discovery service to generate or update timestamped coalesced configuration records 872, each associated with one or more unique service-side identifiers of configuration items as discussed earlier. The coalesced configuration records 872 may be stored at an automatically scaled partitioned data store 820 which forms part of a set of persistent discovery service repositories 810 in the depicted embodiment. Each partition may contain a selected maximum amount of configuration record data, such as M gigabytes, in one implementation, with each client of the discovery service initially being assigned one partition. As and when the client's configuration data approaches the maximum partition size of the client's existing partition(s), new partitions with an associated set of resources (e.g., allocated storage space and/or compute capacity) may be created automatically for the client, and in some implementations some subset of the client's data may be moved to the new partitions for load balancing. In some embodiments, a database service and/or storage service implemented by the provider network may be used for persistent repositories 810. The persistent repositories may also include an optional store 822 for previously-generate query results in some embodiments. The persistent repositories 810 may have an average latency L1 for record retrieval.

In the embodiment depicted in FIG. 8, at least some configuration records may be proactively pre-loaded into a low-latency repository 850 optimized for certain expected types of queries, as indicated by arrow 875. The records may each comprise creation and/or most-recent-modification timestamps in various embodiments. The records may be loaded in reverse chronological order, e.g., with a higher priority being assigned to pre-loading more recently-updated (or more recently-created) records in at least some embodiments. The average latency L2 to access a record from the repository 850 may be smaller than the latency L1 of record accesses to repositories 810. In at least some implementations, the repository 850 may comprise portions of volatile memory at various computing devices of the discovery service that are designated for handling client queries, including temporal or time-series queries directed primarily at recent configuration data. A configuration data cache 852 at repository 850 may implement a data model specifically targeted towards temporal queries (e.g., the logical equivalent of "list the configuration changes that have occurred in the last hour at servers S1 and S2") in some embodiments, such as a data model used in OpenTSDB. In at least some embodiments the maximum space available for the cache 852 may be less than the space available at the persistent records repositories, and as a result older cache entries 892 may be discarded as required to make room for newer entries. In at least some embodiments, the results of some queries may optionally be stored at the query results store 822, and may be re-used as required as indicated by arrow 877.

In some embodiments, additional layers of storage beyond those shown in FIG. 8 may be used—for example, a back-end layer of cold storage may be used for configuration data that has reached a threshold age (such as one month or six months). Such a cold storage layer may be lower cost (and in some cases use a more space efficient format for the data) than the primary persistent data repositories; however, the latencies to retrieve records from the cold storage may be greater. In at least some embodiments a set of snapshot-based programmatic interfaces (or other temporally-oriented programmatic interfaces) may be implemented by the configuration discovery service to enable configuration records corresponding to specified timestamps or time periods to be retrieved from any of the different layers of storage being used. In one embodiment respective snapshots of a client's configuration data for different points in time may be created and stored automatically or on demand as distinct objects by the discovery service, which may enable rapid responses to at least some time-based configuration queries. Snapshots corresponding to various points in time may be loaded on demand (or in anticipation of demand) into the cache 852 in various embodiments from the other layers. In one embodiment the snapshot-based APIs may enable clients to determine whether two snapshot configurations are similar enough for a comparison to be useful, and if so, to provide the results of such a comparison (similar in concept to the results of a "diff" command at the configuration snapshot level).

Methods for Supporting Configuration Discovery Service

Figure 9:
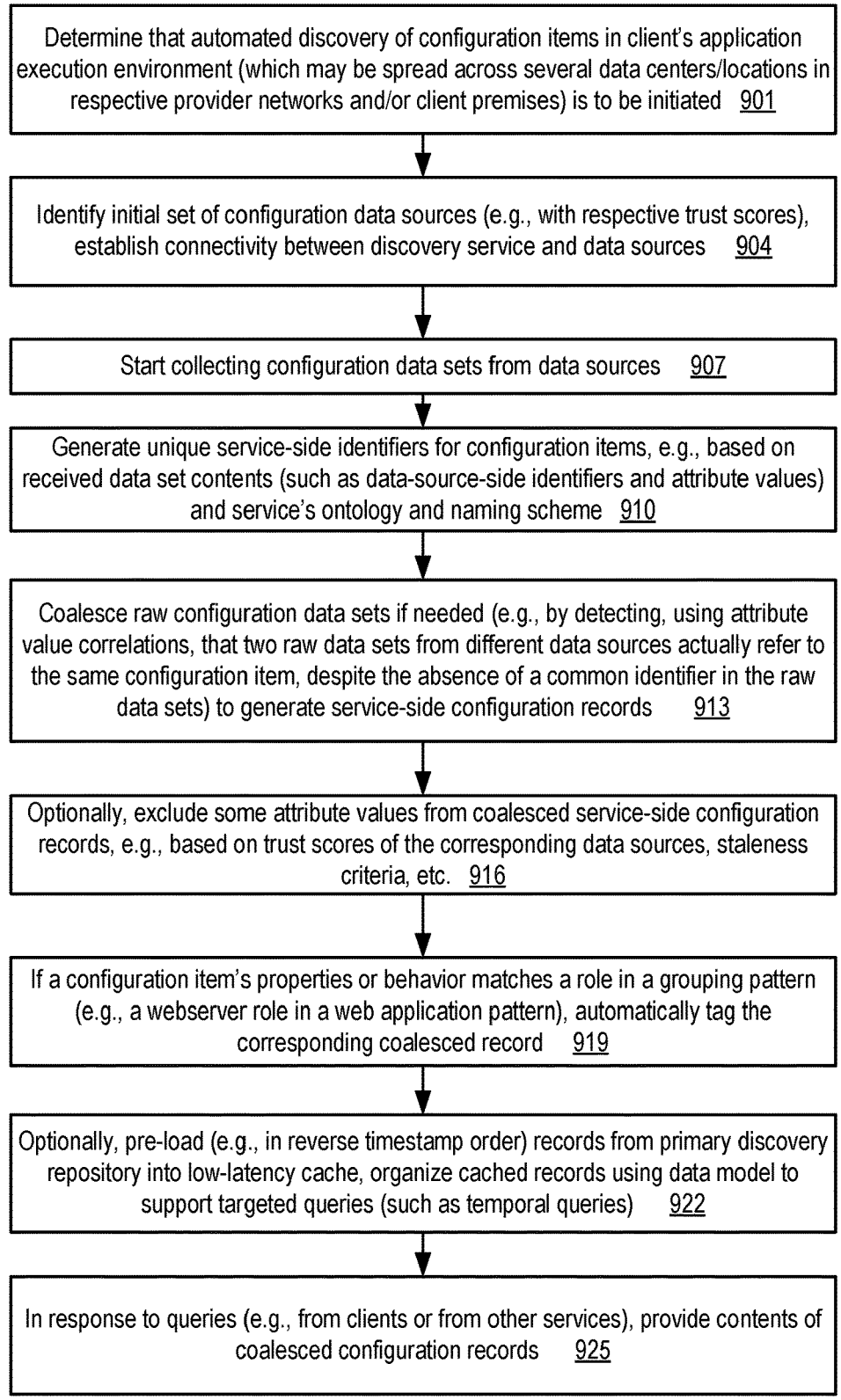
FIG. 9 is a flow diagram illustrating aspects of operations that may be performed at a configuration discovery service, according to at least some embodiments.

FIG. 9 is a flow diagram illustrating aspects of operations that may be performed at a configuration discovery service, according to at least some embodiments. As shown in element 901, a determination may be made that the automated discovery of configuration information from one or more application execution environments of a client is to be initiated at a discovery service. The execution environments may include resources at one or more provider networks (e.g., at a virtual computing service and/or a storage service at the same provider network at which the discovery service itself is implemented, as well as at other provider networks) and/or at customer-owned or customer-managed premises. The determination that the automated discovery is to be initiated may be made, for example, in response to a request received from a customer via a programmatic interface of the discovery service. For example, the service could expose a Startdatacollection API, which can cause agents of the service to initiate automated discovery. For example, the agents can be configured to poll an API for status changes. When the discovery service changes the status in a database to start collecting data, the agents can receive this status update and begin collecting data.

An initial set of configuration data sources may be identified (element 904), e.g., by discovery service agents, and network connectivity may be established between the discovery service and the data sources (e.g., via the agents). A variety of data sources may be used, e.g., including existing configuration management databases of the client, third-party configuration management and/or performance management tools, and/or custom data sources generated specifically for the client. The service may implement programmatic interfaces to receive raw configuration data sets from the different categories of data sources, including bulk export/import interfaces, interfaces for event-driven configuration updates, and the like. The agents can be configured to send data to the programmatic interfaces. For example, the agents can be programmed with information that identifies the endpoint(s) for the programmatic interfaces.

The service may start collecting raw configuration data sets from the data sources (element 907). Each data set may comprise some set of attribute values and some identification information (e.g., identifiers obtained by the data sources) for the associated configuration items. Unique service-side identifiers may be created for various configuration items in the depicted embodiment (element 910), e.g., based on a naming scheme combining elements of data source-side identifiers, attribute values, and/or an ontology defined at the discovery service. The service-side identifiers may differ from at least some of the data source-provided identifiers, and in some embodiments may be used to uniquely identify configuration items such as servers during their lifecycle, even if the configuration items are physically moved, re-deployed for different purposes, and so on. In some embodiments, depending on the extent of the configuration changes applied to a particular configuration item, the discovery service may modify the unique service-side identifier over time. The threshold conditions for changing the service-side identifier may differ from one category of configuration item to another. In one example scenario, for example, if memory or disk space is added to a host, the host's service-side unique identifier may not change, but if the CPU or motherboard is swapped out, the unique identifier may be changed.

Raw configuration data sets from a variety of data sources that may comprise configuration details about the same underlying entity at different granularities, different times, or using different tools may be coalesced at the discovery service in the depicted embodiment (element 913). The raw data sets may not identify the configuration item using a common identifier in some embodiments (for example, different data-source-side identifiers may be provided for the same configuration item in respective raw configuration data sets), and the service may utilize correlations or matches between various attribute values received from the different sources to detect that the configuration data in two different data sets actually refers to the same configuration item. Coalesced configuration records may be generated and stored at one or more persistent repositories of the discovery service.

In at least some embodiments, respective trust scores may be associated with different data sources, and such trust scores may be used to resolve conflicts among reported configuration data, and/or to optionally discard some attribute values received from less trustworthy source (element 916). The coalesced curated configuration records may thus exclude some subset of attribute values indicated in the raw configuration data sets. Some attribute values may be excluded due to staleness (e.g., because the time that has elapsed since the values were collected exceeds a threshold selected at the service) in addition to or instead of being excluded due to trust scores. The trust scores themselves may be adjusted over time, e.g., using machine learning techniques and/or client feedback.

In various embodiments, the discovery service may maintain descriptors for grouping configuration items according to application patterns. If a configuration item's behavior and/or communication pattern matches the behavior or pattern indicated in such a descriptor, the service may automatically tag the configuration item's configuration record with a corresponding role identifier (element 919). For example, the configuration data collected (e.g., the pattern of network packet flows) at the service may be sufficient for the service to recognize that a particular server is a web server of a multi-tier web application pattern, that another server is an application server of that pattern, and so on, without being informed by the client of the roles being played by the servers.

In some embodiments, at least a portion of the coalesced and curated configuration records may be pre-loaded from the original persistent repository into which they were stored into a low-latency repository at which a data model suited to expected types of queries is implemented (element 922). The low-latency repository may comprise a cache (e.g., implemented in volatile memory) from which rapid responses to temporal queries may be provided in some embodiments. The data may be pre-loaded in reverse chronological order (using update timestamps of the coalesced records) in some embodiments, so that queries directed towards more recent changes or metrics are prioritized. The contents of the coalesced records may be provided in response to queries received via the discovery service's programmatic interfaces (element 925).

Visualization Service for Discovered Configuration Information

Figure 10:
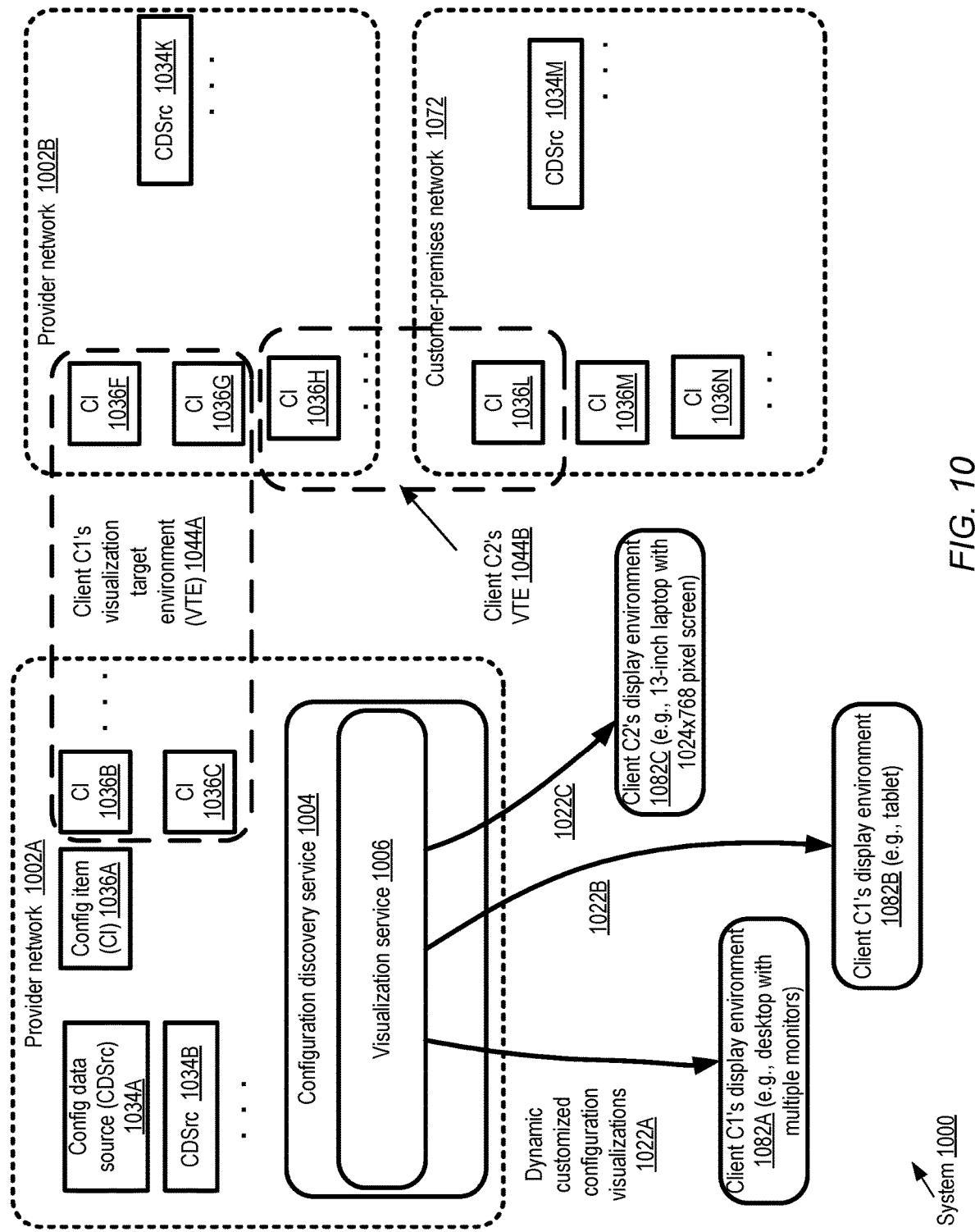
FIG. 10 illustrates an example system environment in which a visualization service for configuration records gathered at a discovery service may be implemented, according to at least some embodiments.

FIG. 10 illustrates an example system environment in which a visualization service for configuration records gathered at a discovery service may be implemented, according to at least some embodiments. As shown, system 1000 comprises provider networks 1002A and 1002B, as well as a customer-premises network 1072. A number of network-accessible services, including a configuration discovery service 1004 similar to that described above in the context of FIG. 1 through FIG. 9, may be implemented at provider network 1002A. In the depicted embodiment, a visualization service 1006 may be implemented as a component of the configuration discovery service 1004, e.g., to provide customized graphical representations of configuration data stored at the discovery service 1004. In other embodiments, the visualization service 1006 may be implemented as a standalone service which obtains configuration records from the discovery service 1004.

System 1000 comprises numerous configuration items 1036, including configuration items 1036A-1036C at provider network 1002A, configuration items 1036F-1036H at provider network 1002B, and configuration items 1036L-1036N at customer-premises network 1072 in the depicted embodiment. Raw configuration data sets (e.g., sets of attribute values) associated with the configuration items may be obtained at various configuration data sources (CDSrcs) 1034, such as data sources 1034A and 1034B of provider network 1002A, data source 1034K at provider network 1002B, and data source 1034M at customer-premises network 1072. The raw configuration data sets may be transmitted to the configuration discovery service 1004, where coalesced configuration records may be generated from the raw data as described earlier and stored in one or more repositories.

The visualization service 1006 may provide dynamically updated context-sensitive graphical representations of configurations of complex application environments to clients in the depicted embodiment. When a given client logs on to a visualization console or otherwise sends an indication that a graphical representation of the client's application execution environment is desired, the visualization service may issue one or more queries using the discovery service's programmatic interfaces to identify a set of configuration items associated with the client for which configuration data is to be displayed. The collection of configuration items 1036 for which information is to be visualized on behalf of a client at a given client-side display environment may be referred to as a visualization target environment (VTE) herein. A given VTE may comprise configuration items distributed among a plurality of data centers of different networks. For example, client C1's VTE 1044A may comprise configuration items 1036B and 1036C at one or more data centers of provider network 1002A, as well as configuration items 1036F and 1036G at one or more data centers if provider network 1002B. Client C2's VTE 1044B may comprise configuration items 1036H at provider network 1002B and configuration item 1036L at customer-premises network 1072 in the depicted example.

In at least some embodiments, the visualization service 1006 may be capable of detecting various properties or constraints of the display environments at which the graphical representation of the VTE is to be shown (e.g., the kinds of screens available for the display, the computing power of the client-side devices responsible for rendering the display, etc.), and adjusting the content to be displayed accordingly. A given client may be able to utilize several different display environments—e.g., client C1's display environment 1082A comprises a desktop with multiple monitors, while another of client C1's display environments 1082B may comprise a tablet computing device. Client C2's display environment 1082C comprises a 13-inch laptop with a 1084×768 pixel screen. In some cases, multiple display environments may be used on behalf of a single client concurrently, and the visualization service may transmit information at different levels of granularity to the different display environments.

Based at least in part on the set of configuration items which have been identified as part of a given client's VTE 1044, and at least in part on the constraints or characteristics of the display environment, the visualization service may select a level of granularity at which the VTE is to be displayed. During a client's interactive session with the visualization service, a number of different views of various subsets (or all) of the client's configuration information available may be provided, with the particular combination or sequence of views provided depending on the objectives of the client for the session. For example, during one session a client may wish to troubleshoot a performance problem, during another session the client may wish to view the changes to an application's configuration over some time period, during a third session a client may wish to identify sources of network packets, and so on. Such sessions or workflows may each comprise a respective sequence of graphical displays or views. Several different modes of displaying configuration data, which may be referred to as "view categories", may be supported by the visualization service in the depicted embodiment, such as for example a hierarchical or tree-oriented view, a graph or network-oriented view, or a table view. The particular view category to be used for a given display during a given session may be selected automatically by the visualization service in at least some embodiments. The selection may be based at least in part on the specific types of configuration data (e.g., performance measurements, network connectivity information, temporal changes in configurations, hierarchical/containment relationships among configuration items, rankings of particular types of configuration items based on client-specified criteria, etc.) that are deemed most relevant to the current state of the session or workflow, and/or based at least in part on the service's predictions or expectations regarding the objectives of the client. The client may be provided control elements (e.g., buttons, drop-down menus and the like) to override the view category selection if desired—e.g., the client may issue a request to change the view from a table view to a hierarchical view or vice versa. Data and/or instructions that can be used to generate dynamic customized configuration visualizations 1022 (e.g., visualizations 1022A-1022C), each representing at least a portion of a VTE at the selected granularity level, together with the view category to be used, may be transmitted to the devices of the client's display environment. The data corresponding to the VTE components may then be rendered for viewing at the client's devices. The visualization service may initiate the display of several different representations of the same VTE in parallel in at least some embodiments.

In at least some embodiments, in addition to initiating the generation of a graphical representation of all or part of the VTE 1044, the visualization service may also provide high-priority or high-importance content to be included in a dashboard for the client. The visualization service may, for example, determine the boundaries of a time window, and cause information about at least some configuration changes which occurred during the time window to be displayed in a "recent changes" section of the dashboard. The dashboard may also be used for receiving client feedback with respect to ambiguities identified by the visualization service and/or the discovery service in various embodiments as described below in further detail. The layout and presentation of the dashboard may also be modified based on the constraints and capabilities of the client's display environment in at least some embodiments.

As and when new configuration information is gathered at the discovery service 1004, the visualization service may automatically update the graphical representations provided to the clients. A number of interactive controls may be made available to the client in the visual interfaces, such as a slider for replaying configuration information as a function of time, as discussed in further detail below.

Context-Based View Transitions

Figure 11:
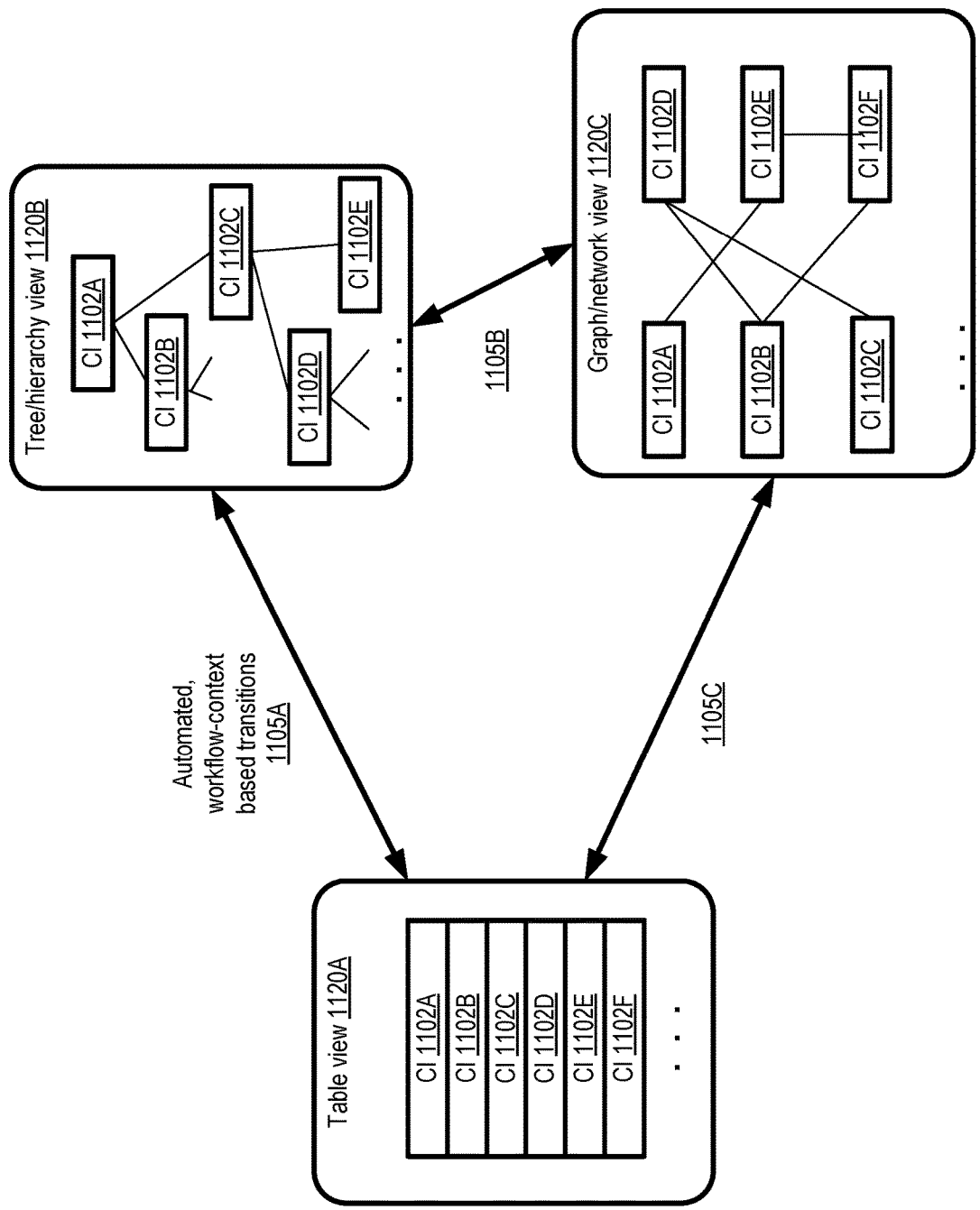
FIG. 11 illustrates example context-based transitions between views that may be implemented automatically by a visualization service, according to at least some embodiments.

The visualization service may be able to anticipate steps of client workflows for viewing configuration data, and adjust the displayed content automatically to provide the most useful views in various embodiments. FIG. 11 illustrates example context-based transitions between views that may be implemented automatically by a visualization service, according to at least some embodiments. Three example view categories are shown: a table view 1120A, a tree or hierarchical view 1120B, and a graph or network view 1120C. In some cases, it may be possible to display about the same set of configuration items, such as configuration items 1102A-1102F, using several or all of the view categories.

The visualization service may select the particular view category to be used based on various factors in the depicted embodiment—e.g., based on the particular stage of the interaction workflow expected to be entered next by the client, based on the type of configuration data to be displayed, the granularity selected for the display, and so on. Examples of configuration data types which may be used to select the view category in various embodiments may include, among others, performance measurements, transaction flows, temporal changes to configurations, network connectivity indicators such as numbers of active connections, containment/hierarchical relationship information, location-based groupings of configuration items, membership in application patterns such as those shown in FIG. 5, and the like. Such automated workflow context-based transitions 1105 (e.g., transitions 1105A-1105C) may be overridden by the client in at least some embodiments—e.g., links or other control elements of the graphical interface being used may be provided for the client to request a change of the view category being used for the displayed data.

The visualization service may maintain a knowledge base of frequently-used client workflows in at least some embodiments, with each workflow representing a respective sequence of displays typically provided to the client to achieve the client's objectives during a session with the visualization service. For example, one such workflow may begin with the client logging in to a visualization console, and being provided a table view of configuration items of a selected type, such as all the hosts being used for the client's applications. In the table view, values of various attributes (e.g., hostname, IP address, current up time, average CPU utilization during a recent time interval, average network bandwidth consumed during a recent time interval, etc.) etc. may be provided for the different hosts. The particular configuration item type to be presented initially in a tabular form after the client logs in may be indicated, for example, in preference settings of the client in one implementation. If the client has not specified preferences for the initial post-login display, in one embodiment the visualization service may attempt to find the largest or most inclusive hierarchical configuration item type (e.g., data centers among which the client's resources are distributed, network subnets used by the client, instances of application patterns similar to those shown in FIG. 5, or hosts) relevant to the client's visualization target environment, and list configuration items of that type.

The view category for the next display of the workflow may be selected based on the interactions of the client with the first display (which may be interpreted as an indication of the objectives of the client for the workflow, e.g., based on matches with previously-used workflows). If the first display comprises a table of host information, and the client requests that the hosts be sorted based on network bandwidth usage metrics, for example, the service may assume that the client wishes to view network connectivity information in the next display. Thus, a network view of a selected set of hosts may be displayed next, indicating for example the network paths between the hosts, the connections open between the hosts, and so on. If the first display comprised a listing of hierarchical containers such as availability containers or data centers, and the client clicks on one of the containers, a hierarchical or tree view category may be selected for the next display, under the assumption that the client wishes to view the contained configuration items. Several factors other than the type of configuration data to be displayed and matches with previously-used workflows may be taken into consideration for automatic view category selection in various embodiments: e.g., the total number of the client's configuration items for which information is available at a given stage of the workflow, the expected size (e.g., in pixels) of the client's display environment, and so on may affect the category view selection. For example, if a client's applications use one thousand hosts, and a smart phone is detected as the client's display environment, a hierarchical or summarized view of the hosts (e.g., based on data center location, or based on subnet membership) may be provided instead of a table view of all one thousand hosts. In one embodiment, clients may request that records of their interactions with the visualization service (which may include client overrides of automated view category selection decisions in some cases) be saved, and such customized records may be used for selecting view categories in subsequent sessions.

Example Visualization Interface Components

Figure 12:
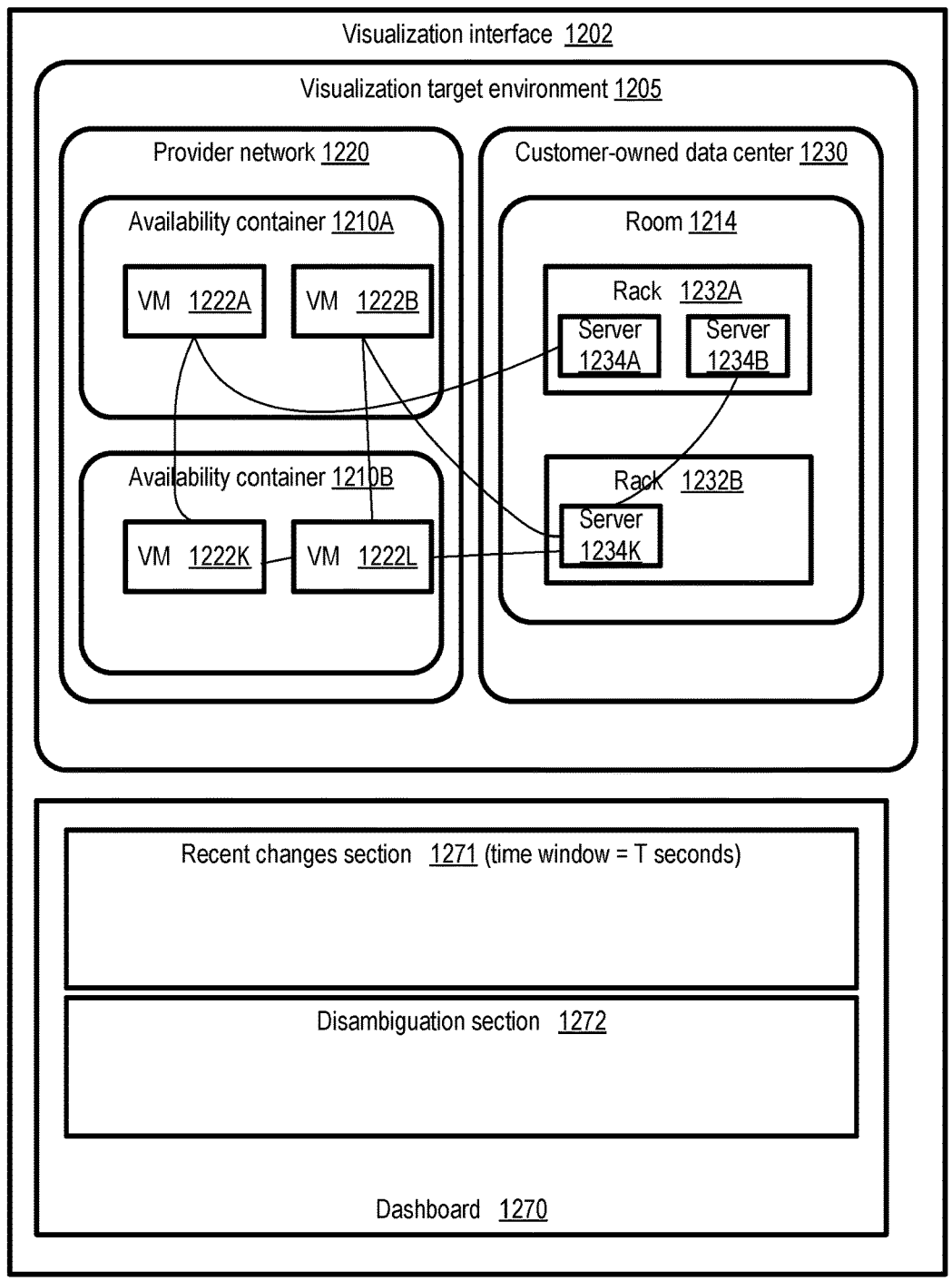
FIG. 12 illustrates example elements of a graphical user interface of a visualization service, according to at least some embodiments.

As mentioned earlier, the visualization service may provide both a graphical view of at least a portion of one or more application execution environments, and a dashboard. FIG. 12 illustrates example elements of a graphical user interface of a visualization service, according to at least some embodiments. As shown, a visualization interface 1202 may show portions or all of a visualization target environment 1205 and a dashboard 1270 in the depicted embodiment. In some embodiments, the graphical user interface may be rendered as part of a browser, while in other embodiments a standalone tool may be employed.

The VTE portion 1205 may show a number of location-based groupings of configuration items. In the depicted example, information about configuration items discovered at a provider network 1220 and a customer-owned data center 1230 is included in the VTE portion. In at least some embodiments, a provider network may be organized into a plurality of geographical regions, and each region may include one or more availability containers, which may also be termed "availability zones". An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances in respective availability containers. For at least some provider network customers, providing a visual representation of the distribution of the resources allocated to the customer among different availability containers may be useful. In the scenario depicted in FIG. 12, virtual machines allocated to the customer are distributed among at least two availability containers. Virtual machines (VMs) 1222A and 1222B run within availability container 1210A of the provider network 1220, while VMs 1222K and 1222L run within a second availability container 1210B.

The location-based groups displayed with respect to a provider network by the visualization service may sometimes differ from the groups displayed with respect to customer-premise networks, e.g., based on differing permissions regarding location details. For example, while the virtual machines 1222 are shown grouped by availability container, the resources shown within customer-owned data center 1230 are grouped by room and server rack. Room 1214 of the data center 1230 comprises two racks 1232A and 1232B of the customer's VTE. Rack 1232A comprises two servers 1234A and 1234B, while rack 1232B comprises server 1234C. Network connections established between the configuration items may also be displayed—e.g., VM 1222A is shown connected to server 1234A and VM 1222K, VM 1222B is connected to VM 1222L and server 1234K and so on. The granularity of the location-based groupings may be selected automatically by the virtualization service, e.g., based on the total number of configuration items, the display environment properties, and so on. In at least one embodiment, the location-based boundary categories to be included automatically (without receiving explicit requests to do so) in a particular graphical representation may be selected from a set which includes, for example, availability container boundaries of a provider network, data center boundaries, rack boundaries, room boundaries, network interconnect topology boundaries, physical machine boundaries, processing container boundaries or virtual machine boundaries. Multiple processing containers corresponding to respective isolated application sets may, for example, be supported at a single hardware host, and the visualization service may provide graphical representations of the containers within a server for certain views.

The dashboard 1270 may include two types of information in the depicted embodiment: recent configuration changes (shown for a selected time window in section 1271), and a disambiguation section 1272. Configuration changes that have occurred in a recent time window may be ranked (e.g., based on relevance scores of the kinds discussed above and/or based on other factors) and displayed in order or rank in section 1271 in the depicted embodiment. This may enable clients to quickly understand how their application execution environment is changing.

In some embodiments, the configuration discovery service could utilize the visualization interface to obtain client feedback to help confirm or resolve questions regarding the identity of configuration items. If a determination is made that client feedback-based disambiguation of the identity of a particular configuration item is to be initiated, a disambiguation request may be shown in section 1272 of the interface. For example, the request could indicate a proposed identity and/or one or more attribute values of a configuration item with a symbol (e.g., a question mark or a text balloon) requesting confirmation of the proposed identity. The client may confirm the identity by entering feedback (e.g., a checkmark), or provide an alternative identifier or name. If the ambiguous identity is resolved with the help of the client's feedback, the configuration discovery service may update (or mark as verified) its configuration records, and the disambiguation request may be removed from section 1272 in the depicted embodiment.

Figure 13:
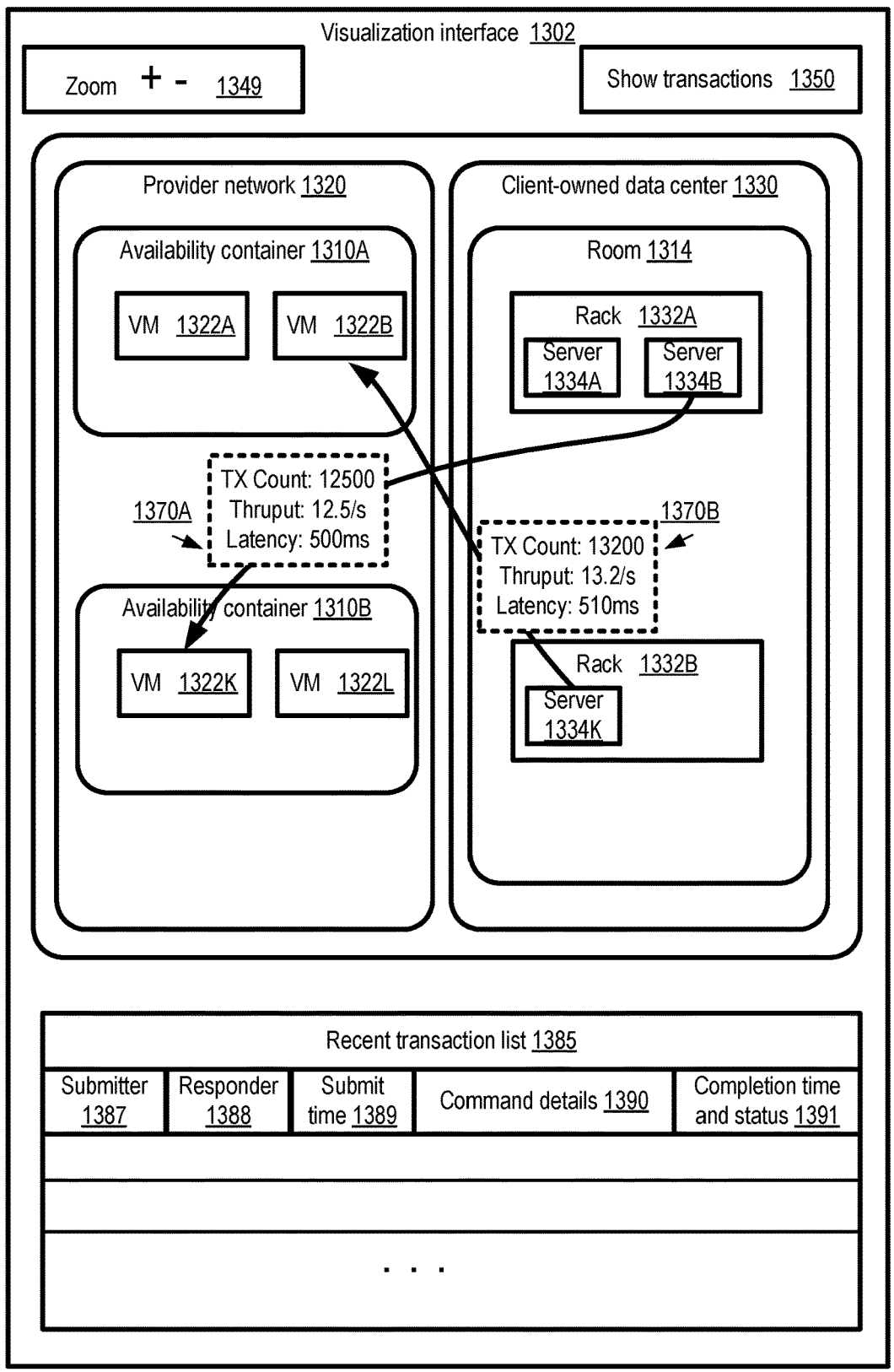
FIG. 13 illustrates examples of transaction-related information that may be displayed with the help of a visualization service, according to at least some embodiments.

In some embodiments, the visualization service may enable clients to examine details (e.g., latencies) associated with various types of transactions that were identified by the configuration discovery service. FIG. 13 illustrates examples of transaction-related information that may be displayed with the help of a visualization service, according to at least some embodiments. As shown, visualization interface 1302 may include a "show transactions" control element 1350 (e.g., a button) as well as a zoom control element 1349 which enables clients to increase or decrease the granularity at which information is displayed. The zoom control element 1349 may be used, for example, to arrive at a level of granularity in which individual virtual machines 1322 (within provider network 1320) and servers 1334 (within customer-owned data center 1330) are shown. When the client clicks on the "show transactions" button, the display may be updated to show regions 1370A and 1370B. Region 1370A shows that requests for 12500 transactions (where the definition of a transaction may be service-selected or client-selected) were transmitted during some time period (100 seconds in this example) from server 1334B at rack 1332A of room 1314 of the customer-owned data center to virtual machine 1322K of availability container 1310B of provider network 1320. The average throughput was 12.5 transactions per second, and the average transaction latency or response time was 500 milliseconds. Similarly, region 1370B shows the count, throughput and latency for transactions submitted from server 1334K to virtual machine 1322B.

A recent transaction list 1385 may be included in the display in the depicted embodiment. For some number of recent transactions associated with the currently-displayed portion of the visualization target environment, details such as an identifier of the submitter configuration item 1387 (e.g., a process or host from which the transaction was initiated), the responder 1388, the submit timestamp 1389, transaction command/request details 1390, and the completion time and status (e.g., commit/abort) 1391. The client may be able to sort the recent transactions based on selected attributes using the visualization interface, request that transactions for a selected time period be displayed, and/or view additional details about the transaction sender or the transaction responder. In some embodiments, clients may submit transaction descriptors via the visualization service (e.g., indicating the packet flow sequence, the formats of the transaction requests and responses and the like), enabling the configuration discovery service to monitor the transactions as they occur. In other embodiments, the discovery service may be able to detect frequent request/response patterns in the communications between various configuration items and may use these patterns to define transactions.

Figure 14:
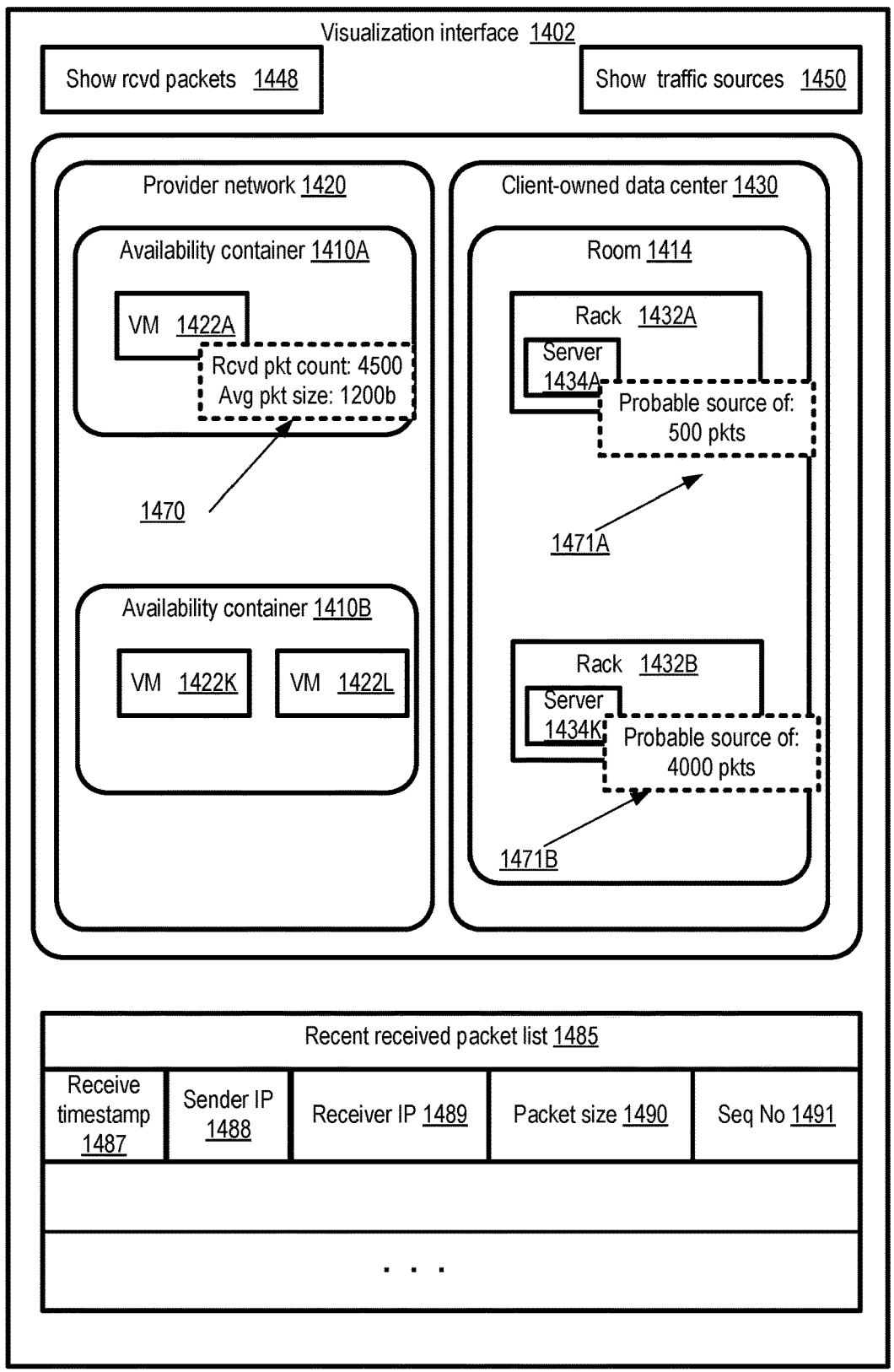
FIG. 14 illustrates examples of network traffic-related information that may be displayed with the help of a visualization service, according to at least some embodiments.

FIG. 14 illustrates examples of network traffic-related information that may be displayed with the help of a visualization service, according to at least some embodiments. As mentioned earlier, it may sometimes be the case that network traffic pathways may include obfuscating devices such as address translators or port translators that make it harder to detect the true sources from which one or more packets were sent. In the depicted embodiment, the visualization service may provide control elements (such as control element 1448) to show statistics regarding the number of network packets received at selected configuration items (e.g., virtual machine 1422A). In the example scenario shown, region 1470 indicates that, during some selected time interval, a total of 4500 packets were received at virtual machine 1422A of availability container 1410A and provider network 1420.

Control element 1450 labeled "show traffic sources" may be used to submit a source detection query for received packets to the configuration discovery service via the visualization service. In response, the discovery service may employ any of several source identity detection algorithms such as those discussed in the context of FIG. 6 to ascertain the probable identity of the configuration items which may have transmitted packets via obfuscating intermediaries to the virtual machine 1422A. The algorithms may comprise, for example, sending multiple connection establishment and teardown requests in unusual patterns, closely tracking packet inter-arrival times and matching them with inter-transmission times, monitoring sequence numbers and the like. As indicated in regions 1471A and 1471B, the configuration discovery service has identified server 1434A as the likely source of 500 of the 4500 packets, and server 1434K as the likely source of the remaining 4000 packets in the depicted example. It is noted that source identification for some packets may not necessarily require the invocation of the kinds of identity detection algorithms discussed here: the sources of packets which do not pass through an obfuscating intermediary may be obtained simply from their packet headers by the configuration discovery service.

In some embodiments the visualization interface may include a recent received packets list region 1485, in which details such as receive timestamps 1487, apparent sender IP addresses 1488, receiver IP addresses 1489, packet size 1490 and/or sequence numbers 1491 may be displayed. Clients may be able to sort and/or rearrange the contents of the recent received packets list region 1485 as desired via controls provided by the visualization interface.

Figure 15:
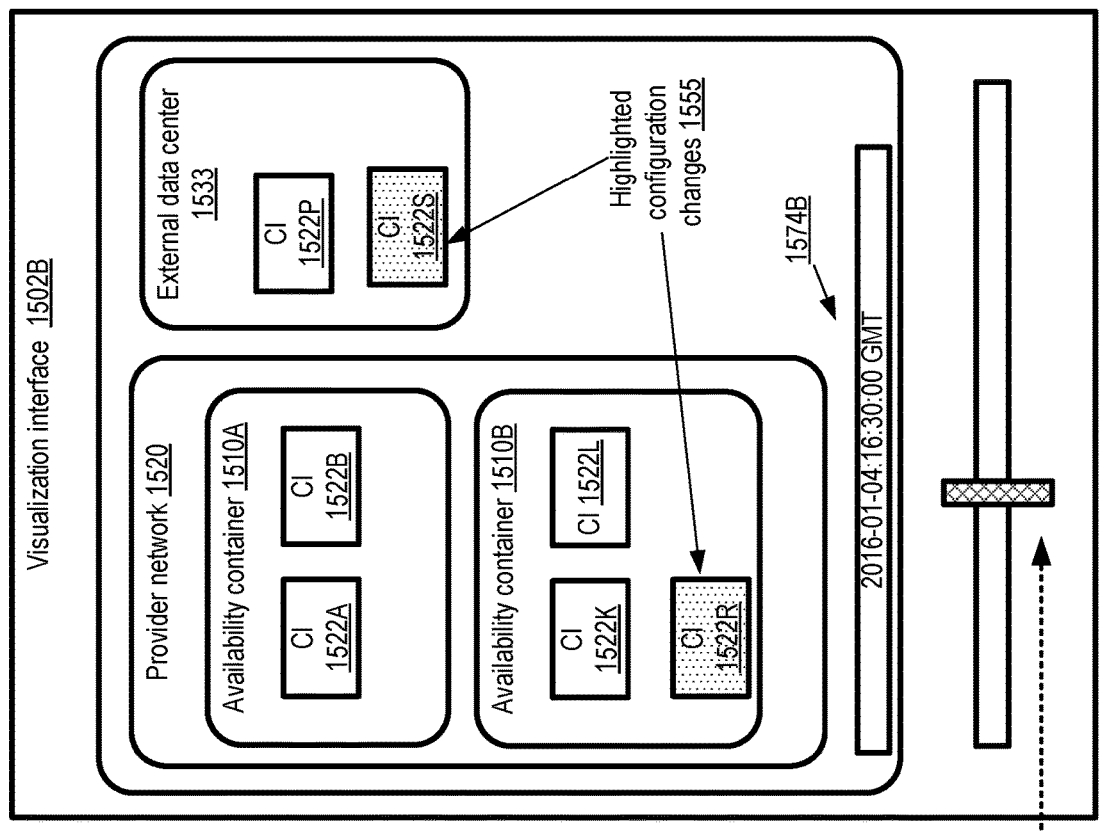
FIG. 15 illustrates an example of a use of a slider control to obtain visualizations of configuration changes over time with the help of a visualization service, according to at least some embodiments.
Figure 15:
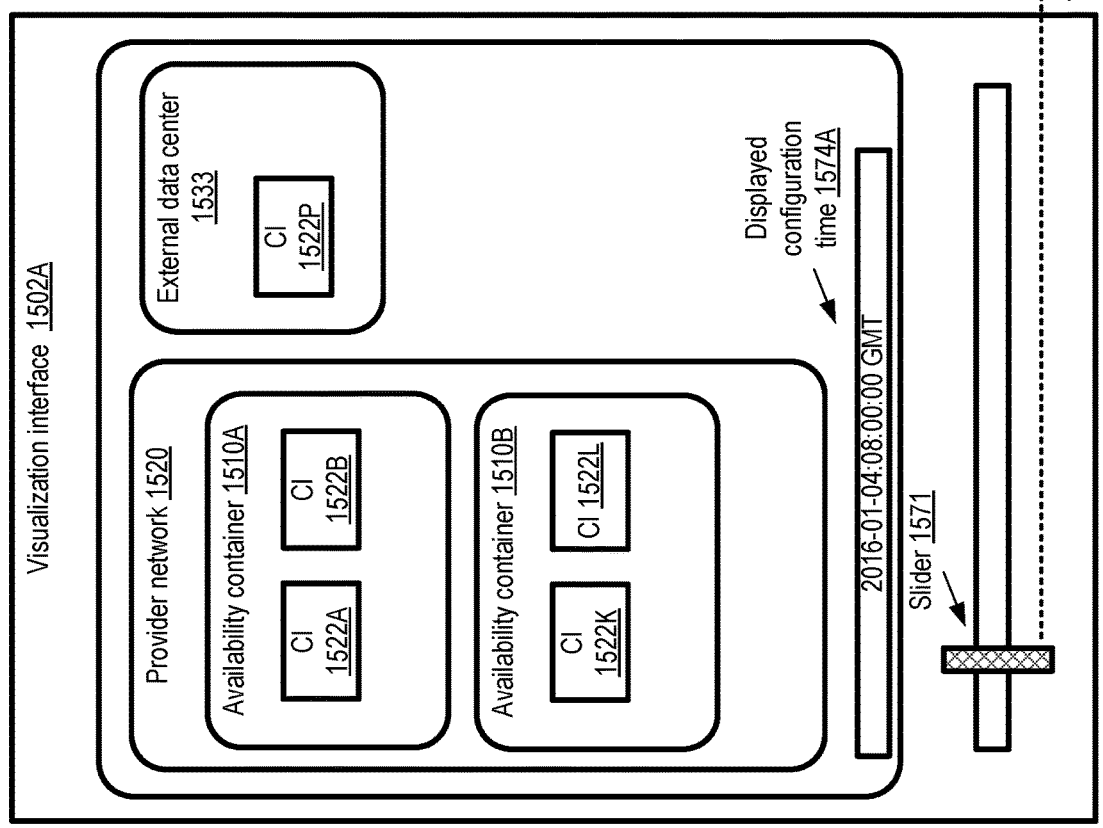

FIG. 15 illustrates an example of a use of a slider control element to obtain visualizations of configuration changes over time with the help of a visualization service, according to at least some embodiments. The slider control element 1571 may enable clients to view the state of their visualization target environments at various points in time. In the depicted example, visualization interface 1502A shows that a client's target environment includes five configuration items (CIs 1522A and 1522B at availability container 1510A of provider network 1520, CIs 1522K and 1522L at availability container 1510B, and CI 1522P at external data center 1533) as of a point in time indicated in element 1574A.

As the slider is moved to the right (as indicated by arrow 1551), e.g., using a mouse or a fingertip depending on the display environment being used by the client, the time shown in element 1574A may advance, and the configuration items shown in the interface may change. At the time corresponding to element 1574B, for example, interface 1502B shows that two new configuration items have been added to the client's target environment. Configuration item 1522R has been added to availability container 1510B, while configuration item 1522S has been added to the external data center. In at least some implementations, newly-added configuration items may be highlighted (e.g., temporarily shown in a different color) as indicated by arrows 1555. Interactive controls other than sliders (e.g., radio-style buttons or fast-forward/rewind controls) may be provided for time-based configuration displays in some embodiments. The interface may also provide additional controls associated with temporal queries, e.g., to enable clients to capture machine-readable snapshots of the state of their visualization target environments at various points in time, to show only the differences in the configurations at specified points in time, to plot the changes on a timeline, and so on. Slider 1571 and other time-oriented controls of the visualization interfaces may rely on snapshot-based and/or other temporally-oriented APIs of the discovery service (discussed above in the context of FIG. 8) in various embodiments.

Figure 16:
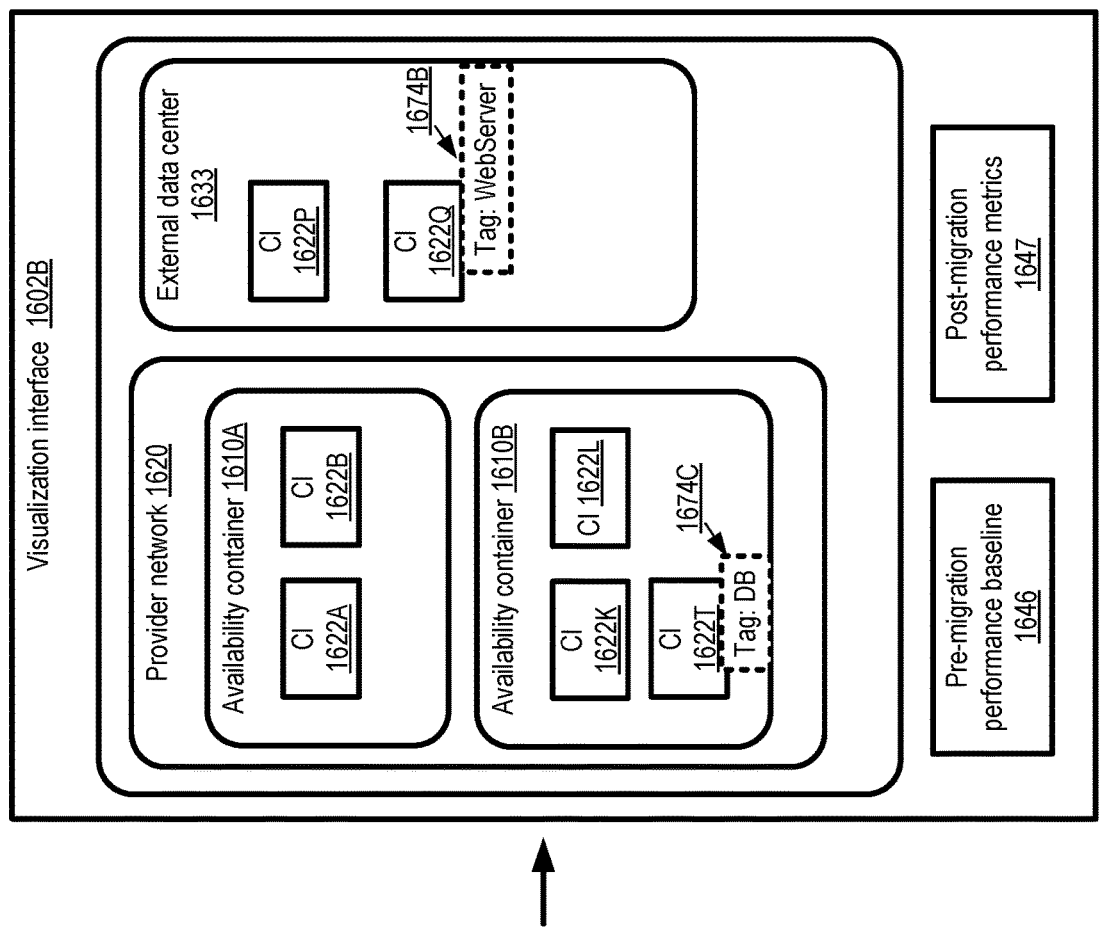
FIG. 16 illustrates an example of a use of a visualization service to initiate a phased migration of an application execution environment, according to at least some embodiments.
Figure 16:
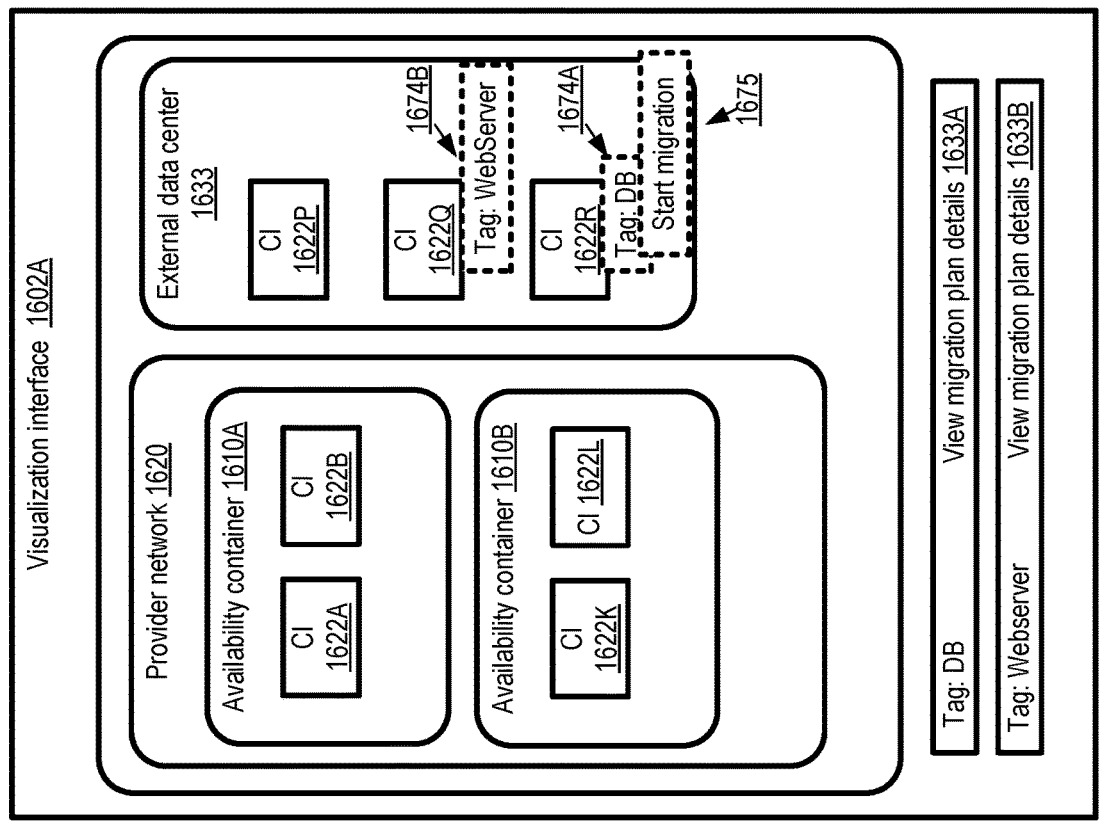

In some embodiments, the visualization service may provide mechanisms to permit clients to migrate application components from one data center or provider network to another. FIG. 16 illustrates an example of a use of a visualization service to initiate a phased migration of an application execution environment, according to at least some embodiments. In the depicted scenario, tags indicating the roles played by various configuration items within application patterns may be indicated in the visualization interface 1602A. For example, based on the patterns of interactions among the client's configuration items, the configuration discovery service may have identified a multi-tier web application. Configuration item 1622Q running at external data center 1633 may have been identified as a web server of the multi-tier web application, while configuration item 1622R may have been identified as a database server of the multi-tier web application. Tags 1674A and 1674B may have been generated for the configuration items 1622Q and 1622R respectively.

Plans to migrate the components of the multi-tier web application in stages to the provider network 1620 may have been generated in the depicted embodiment, e.g., at a migration planning and implementation service. Each stage of the migration may involve the transition of configuration items playing a particular role (e.g., "webserver" or "database server") to the provider network. Migration plan details for each role may be viewed using controls 1633A (for database servers) and 1633B (for webservers). A control element 1675 may be provided to enable the client to initiate phased migration for configuration items associated with particular tags.

If and when the client requests the migration of configuration items tagged with the label "DB" for database server in the depicted example, the visualization service may transmit corresponding requests programmatically to the discovery service and/or the migration implementation service in the depicted embodiment. After the database server corresponding to configuration item 1622R has been transitioned as part of the phase migration to availability container 1610B of the provider network 1620, the client's view may be updated to show the migrated configuration item (labeled 1674C) as shown in interface 1602B.

In at least some embodiments, the visualization service may also support interfaces enabling before-and-after performance comparisons with respect to migrations. For example, a baseline view of the performance of the application (e.g., throughput, transaction latencies/response times, etc.) prior to a migration may be shown in region 1646, while the corresponding post-migration performance statistics may be shown in region 1647. If the post-performance statistics are unsatisfactory, the client may initiate the reverse migration (e.g., moving the database server back to the external data center in the depicted example) if desired.

In one embodiment, the visualization interface may be used by clients to directly specify tags to be associated with various roles played by configuration items within applications. For example, an "add tag" control may be provided for clients to define new tags or associate existing tags with selected configuration items via the interface. Over time, a library of tags may be accumulated, and clients may use the visualization interface to inspect available tags, issue tagging requests with respect to existing tags of the library, or add new tags to the library. In effect, the client may "teach" the discovery service regarding application patterns using such controls provided by the visualization service. After the client has associated a webserver tag, for example, with one or more configuration items using the visualization service, the discovery service may monitor the behavior (e.g., the patterns of network interactions with other configuration items) of the tagged items. The discovery service may be able to generate heuristics, based on the observed behavior, which can be used to automatically tag other configuration items with the same labels/tags as the examples provided by the clients, without being explicitly requested by the client to do so. For example, after the client has provided some examples of web servers or database servers within an environment implementing a multi-tier web application architecture, the discovery service may be able to identify other web servers and/or database servers within other environments implementing similar application architectures on its own, and display auto-generated tags accordingly.

Methods for Supporting a Configuration Data Visualization Service

Figure 17:
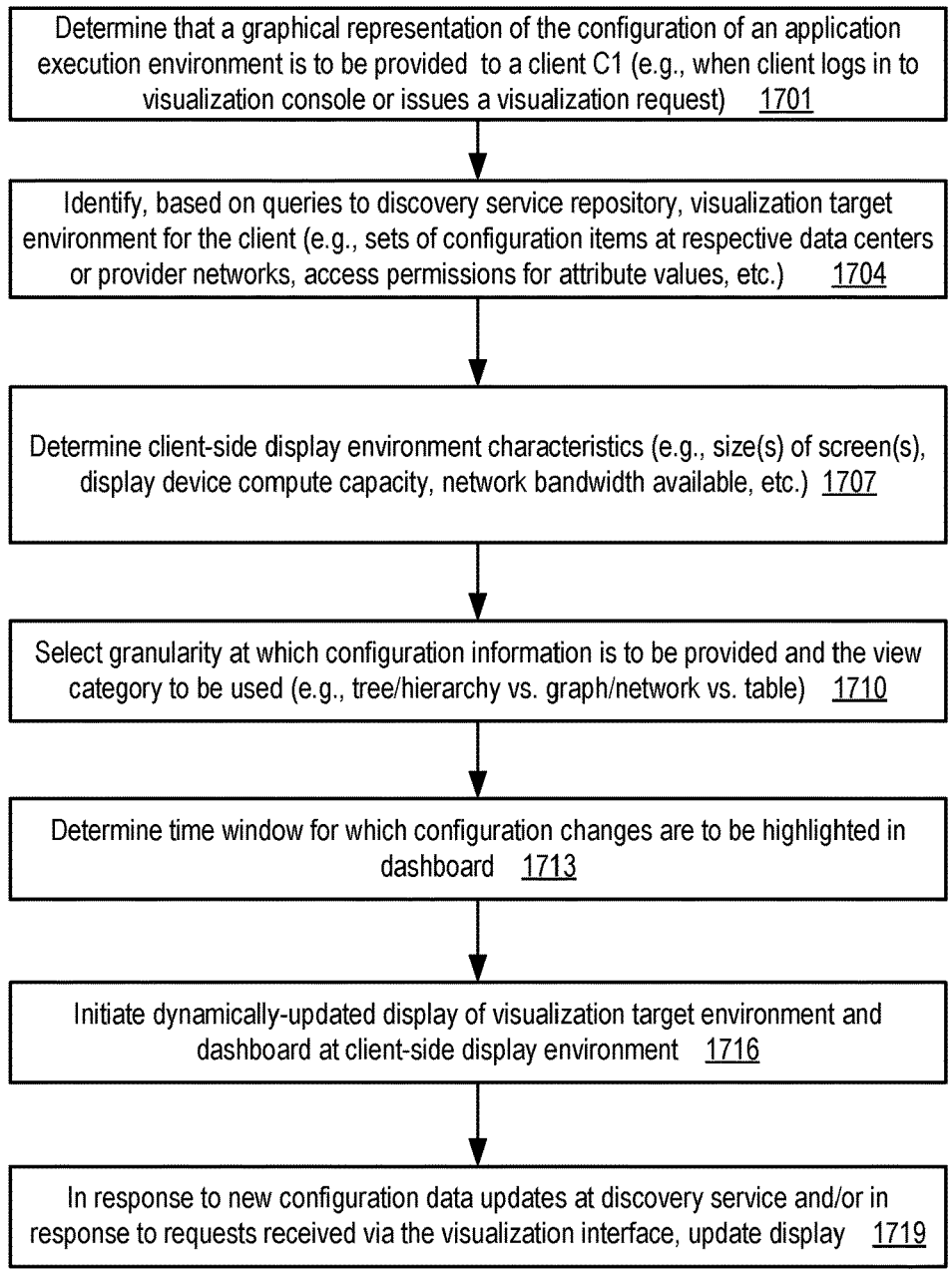
FIG. 17 is a flow diagram illustrating aspects of operations that may be performed by a visualization service to provide graphical representations of configuration records, according to at least some embodiments.

FIG. 17 is a flow diagram illustrating aspects of operations that may be performed by a visualization service to provide graphical representations of configuration records, according to at least some embodiments. As shown in element 1701, a determination may be made, e.g., when a client logs in to a visualization tool or console or when a client issues a visualization request via a programmatic interface, that a graphical representation of configuration information associated with one or more application execution environments of the client is to be provided. The application execution environments may comprise resources distributed among one or more data centers. Some of the data centers may be part of respective provider networks, while others may be at customer-owned premises. Using one or more queries directed to a discovery service's repository of coalesced configuration records, the visualization service may identify the particular visualization target environment or environments for which information is to be displayed (element 1704). In some embodiments, the visualization service may be external to the configuration discovery service, while in other embodiments the visualization service may form part of the configuration discovery service. In some cases a given customer account of the visualization service (or the discovery service) may have several different application execution environments associated with the account, and the particular set of configuration items that can be viewed may differ from one client-side display environment to another. From a workstation situated within a customer's offices, for example, a larger subset of the client's application execution environments may be accessed via visualizations than from a tablet computer. In at least some embodiments, an identity and access management system may be used to determine the kinds of configuration items for which a display can be provided.

The visualization service may identify various characteristics of the client-side display environment (e.g., using APIs supported by the client-side device operating systems) (element 1707). The characteristics may include the number and sizes of the screens available, the computing capacity of the client-side device at which the graphical representation is to be provided, the network bandwidth available for communications between the service and the client device, and so on. Based on the amount of configuration data available for the visualization target environment, and/or on the characteristics of the display environment, a number of decisions may be made at the visualization service regarding the initial graphical representation to be generated for the client. These decisions may include selecting the granularity at which configuration information is to be displayed (e.g., aggregated at the data center level, availability container level, room level, server level, etc.) and the view category to be used (e.g., a tabular view, a graph/network view or a tree/hierarchical view) (element 1710).

In at least some embodiments a time window with respect to which configuration changes are to be highlighted, e.g., using a dashboard portion of the visualization interface, may be determined (element 1713). A dynamically updated display of the visualization target environment using the selected granularity and view category may be initiated at the client-side display environment (element 1716). As and when new configuration data becomes available from the discovery service, or in response to requests issued programmatically by the client, the display may be updated (element 1719). In one embodiment, the characteristics of the client-side display environment may sometimes be deemed insufficient to display the information requested by the client. For example, the screen space available may be too small to show the level of detail requested by the client, or the network bandwidth available to the client device may be too small to transfer the amounts of data requested in a reasonable amount of time. In some such scenarios, based for example on an estimate of resource usage associated with fulfilling the visualization request via the current client-side display environment, the visualization service may transmit a recommendation to utilize an offline tool (or a different client-side display environment than the one being used currently) for displaying information requested in the visualization request.

Migration Marketplace Service

As mentioned in the context of FIG. 1, a provider network may implement one or more migration-related services in some embodiments, with the high-level goals of enabling customers to transfer applications or application components from one set of physical or virtual platforms to another as desired, e.g., to help reduce costs, increase the availability or resilience of the applications, simplify management, and the like. The information collected by the discovery service may be useful in making migration-related decisions as discussed earlier. However, due in part to the many dependencies among the components of complex application stacks, the process of transitioning an application from one environment to another may sometimes benefit from expertise that may not be available within the application-owner organizations. In some embodiments, the provider network at which the configuration discovery service runs may act as an intermediary between migration facilitators or experts and application owners by implementing a migration marketplace service. A business entity that is able to help plan and/or implement the migration of applications or application components from one set of execution platforms to another, such as from a customer-owned data center to a provider network or from one provider network to another, may be termed a migration facilitator or a migration practitioner herein. If the migration facilitator differs from the entity which operates the target set of execution platforms (to which the application is to be migrated) and differs from the entity whose application is being migrated, the migration facilitator may be referred to as a third-party migration facilitator. At least some migration facilitators may not be characterized as third parties—e.g., a professional services or consulting organization which is part of (or affiliated with) one of the provider networks to/from which migrations are to be performed may also utilize the migration marketplace service in the role of a migration facilitator in some embodiments. At a high level, the migration marketplace service may enable application owners to learn about potential partners that can help with complex application migration tasks, and may enable migration facilitators to find customers. Migration facilitators may include tool providers (e.g., independent software vendors or ISVs that develop migration tools which can be used by clients to implement application migrations), technical experts who are available to actually plan and implement migrations instead of providing tools as such, professional services organizations, partners of the provider network operator, and so on in various embodiments.

Figure 18:
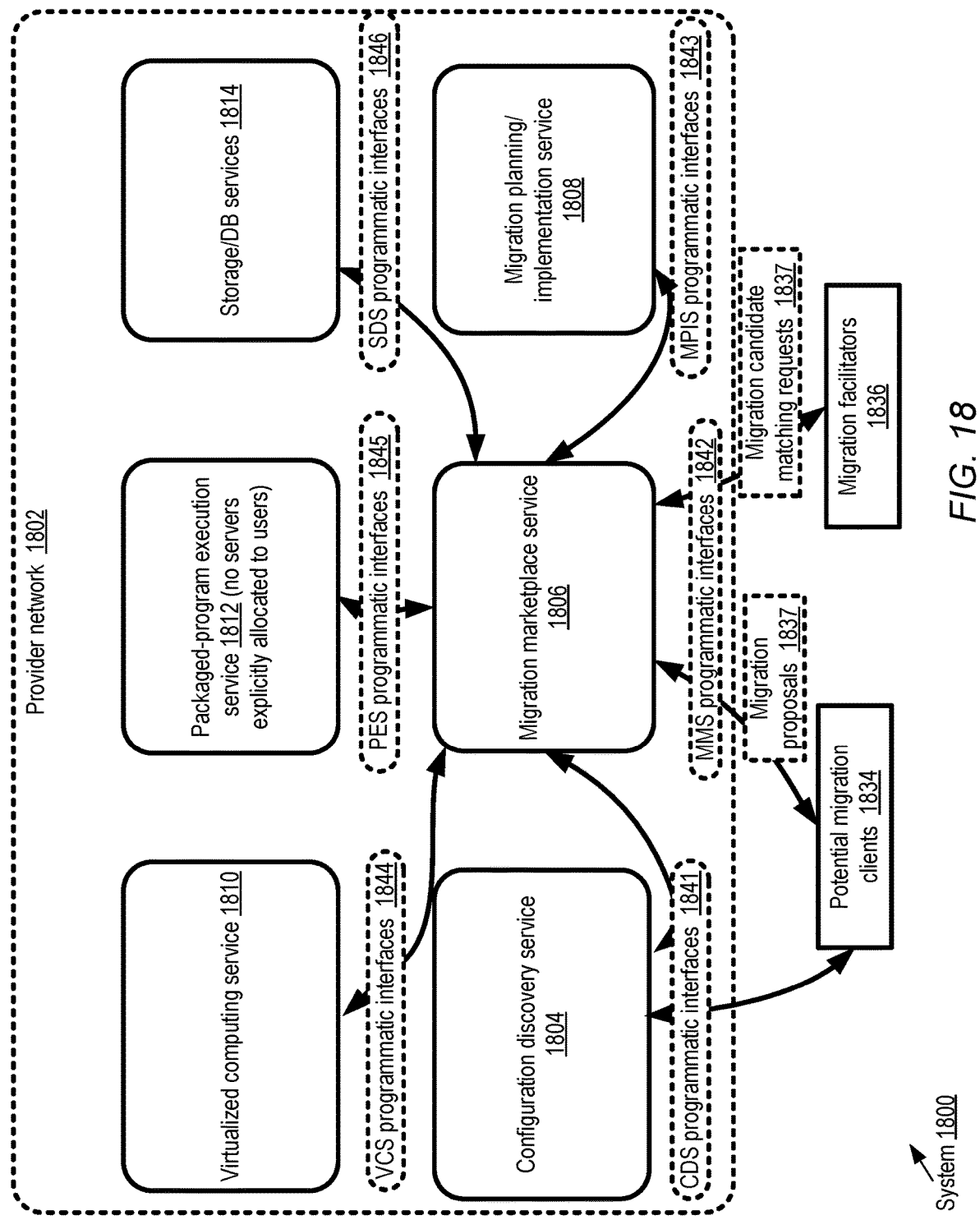
FIG. 18 illustrates an example system environment in which a migration marketplace service which utilizes data collected at a configuration discovery service may be implemented, according to at least some embodiments.

FIG. 18 illustrates an example system environment in which a migration marketplace service which utilizes data collected at a configuration discovery service may be implemented, according to at least some embodiments. As shown, system 1800 comprises a provider network 1802 at which a number of network-accessible services are implemented. The services include a virtualized computing service 1810, a packaged-program execution service 1812, one or more storage or database services 1814, a configuration discovery service 1804, a migration marketplace service 1806, and a migration planning and implementation service 1808. Each service may implement a set of programmatic interfaces in the depicted embodiment, which may be used for interactions between the services and their clients, and may also be used for inter-service interactions in some cases. The VCS programmatic interfaces 1844 associated with virtualized computing service 1810 may be used to acquire, use and release virtual machines. The PES interfaces 1845 of the packaged-program execution service 1812 may be used to submit requests for the execution of programs without explicitly allocating servers to the requesters, and for receiving results of the program executions. The SDS programmatic interfaces 1846 may be used to store and access data sets associated with various applications. The CDS programmatic interfaces 1841 of the discovery service 1804 may be employed to initiate automated discovery of configuration information as discussed earlier, and to view the results of the automated discovery. The MPIS interfaces 1843 of the migration planning and implementation service 1808 may be used to generate detailed migration plans and execute the plans.

The migration marketplace service 1806 may utilize some or all of the other services shown in FIG. 18 in the depicted embodiment. The MMS programmatic interfaces 1842 of the migration marketplace service may be utilized by at least two types of entities—potential migration clients 1834 (e.g., owners of applications that may be migrated) and migration facilitators 1836. According to one embodiment, a client 1834 may transmit a request to the migration marketplace service to enable one or more migration facilitators to access at least some subset of the configuration information associated with the client's applications. The configuration information to which access permission is to be granted may, for example, be stored in the coalesced configuration records of a repository maintained at the discovery service 1804. As discussed earlier a given application execution environment of the client 1834 may include configuration items or resources distributed among a plurality of platforms, e.g., including some resources outside provider network 1802 and/or some resources located within provider network 1802. In some embodiments, the client 1834 may request that at least some of the configuration details be obfuscated or anonymized before being provided to the migration facilitators—that is, the facilitators may be permitted to access some aspects of the configuration information without being provided the full details. In some cases, the clients may allow only a specified set of migration facilitators to examine the configuration information, while in other embodiments any migration facilitator which has been registered or approved by the migration marketplace service may be granted access permission. In response to a client request to share access to the client's configuration record collection, the migration marketplace service 1806 may initiate the modification of one or more security settings for the configuration records (e.g., either within metadata maintained by the migration marketplace service itself, or within metadata of the discovery service 1804).

The migration marketplace service 1806 may receive respective membership requests from migration facilitators via the MMS programmatic interfaces 1842 in the depicted embodiment. In at least some embodiments, the migration marketplace service may initiate a set of validation procedures (e.g., to verify the identity and business background of the facilitator) before registering a migration facilitator as an authorized member of the marketplace.

A registered migration facilitator may transmit a migration candidate matching request 1837 via interfaces 1842 in the depicted embodiment. Such a request may include, for example, a description of the facilitator's expertise or capabilities (e.g., the kinds of application stacks whose migrations the facilitator has helped with in the past) and/or characteristics of the kinds of migration clients the facilitator would prefer (e.g., a minimum or maximum size of the to-be-migrated application execution environment, the geographical location of the to-be-migrated application execution environment or the migration destination environment, etc.). A response to the migration candidate matching request 1837, identifying one or more potential customers for the facilitator from among clients of the discovery service 1804 may be generated at the service 1806 using configuration information to which the migration facilitator has been granted access. In some embodiments a discussed below in further detail, the migration marketplace service 1806 may execute service-generated algorithms to find matching customers, while in other embodiments the facilitator may supply its own executable code modules to find potential customers and the facilitator-supplied code may be run at the pre-packaged program execution service 1812 or at some other platforms.

The migration facilitator 1836 may examine the provided information regarding potential migration candidates provided by service 1806, and submit a migration proposal via the interfaces 1842 to the service 1806. The proposal may describe various aspects of the assistance that the facilitator is willing to provide, including for example a preliminary cost estimate for migrating a specified subset or all of an application execution environment, a preliminary schedule or implementation plan, and the like. If the migration facilitator is an independent software vendor offering a migration tool rather than a technical expert interested in actually implementing the migration, the name of the tool (which can be used by the client to migrate their application) may be included in the proposal in some embodiments. The service 1806 may then transmit a representation of the proposal 1837 to the potential migration client 1834 via the programmatic interfaces 1842. The service 1806 may receive numerous proposals for a given application environment of the same potential migration client 1834 in some embodiments, each of which may be programmatically provided to the client.

If the client 1834 finds one of the proposals acceptable and wishes to proceed with detailed migration planning and/or implementation, in some embodiments an approval message may be transmitted to the migration marketplace service via interfaces 1842. In response to such an approval message, in one embodiment the migration marketplace service may initiate operations to enable the client 1834 to execute a workflow of a migration planning/implementation service 1808, e.g., by seamlessly and programmatically transferring further migration interactions to MPIS interfaces 1842. Thus, in at least some embodiments, the migration marketplace service 1806 may not necessarily be responsible for detailed planning and actual implementations of migrations; instead, the primary role of the migration marketplace service 1806 may comprise acting as a trusted conduit of information between potential migration clients and migration facilitators before the detailed work of planning and executing a migration is begun. In other embodiments, the migration marketplace service may be responsible for planning and/or coordinating the implementation of at least some aspects of migration. It is noted that the visualization service discussed herein in the context of FIG. 10-FIG. 17 may also be used with the migration marketplace service 1806 and/or migration planning/implementation services 1808 in some embodiments. The visualization service may provide a unified seamless set of graphical interfaces which can be used to view application execution environment configuration data, identify potential facilitators for application migrations, and plan and implement such migrations as desired in such embodiments.

Programmatic Interactions with Migration Marketplace Service

Figure 19:
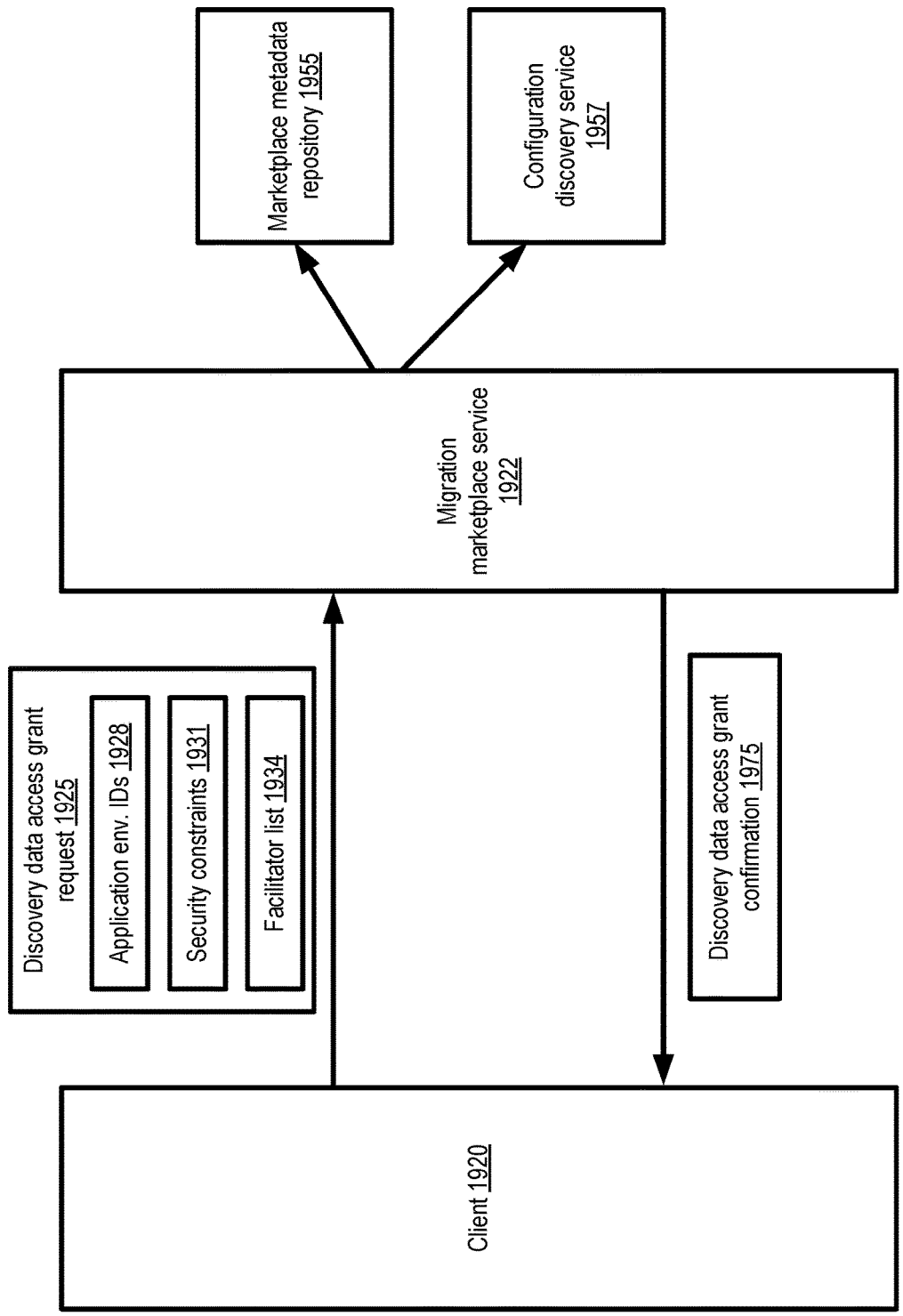
FIG. 19 illustrates example programmatic interactions between a client and a migration marketplace service, according to at least some embodiments.

FIG. 19 illustrates example programmatic interactions between a client and a migration marketplace service, according to at least some embodiments. As shown, a client 1920 may submit a discovery data access grant request 1925 to one or more computing devices of the migration marketplace service 1922 via programmatic interfaces. The discovery data access grant request 1925 may comprise, for example, a set of application environment identifiers 1928 corresponding to the client's configuration record collections, one or more security constraints 1931 and/or a facilitator list 1934. The facilitator list 1934 may indicate one or more specific facilitators to which configuration information of the client 1920 is to be disclosed if needed, or may indicate that any registered/authorized facilitator may be provided the configuration information. Security constraints 1931 may indicate whether any limits are to be placed on the revealed configuration data (e.g., the client may prefer that details of some types of configuration items not be revealed at the individual configuration item level although aggregated information may be revealed), which aspects of the configuration information if any are to be anonymized or obfuscated, and so on.

Based at least in part on the contents of the request 1925, the migration marketplace service 1922 may modify security settings associated with the client's configuration records, e.g., at a marketplace metadata repository 1955 and/or at the configuration discovery service 1957. A confirmation message 1975 indicating that the requested access permission changes have been applied may be transmitted to the client 1920 via a programmatic interface.

Figure 20:
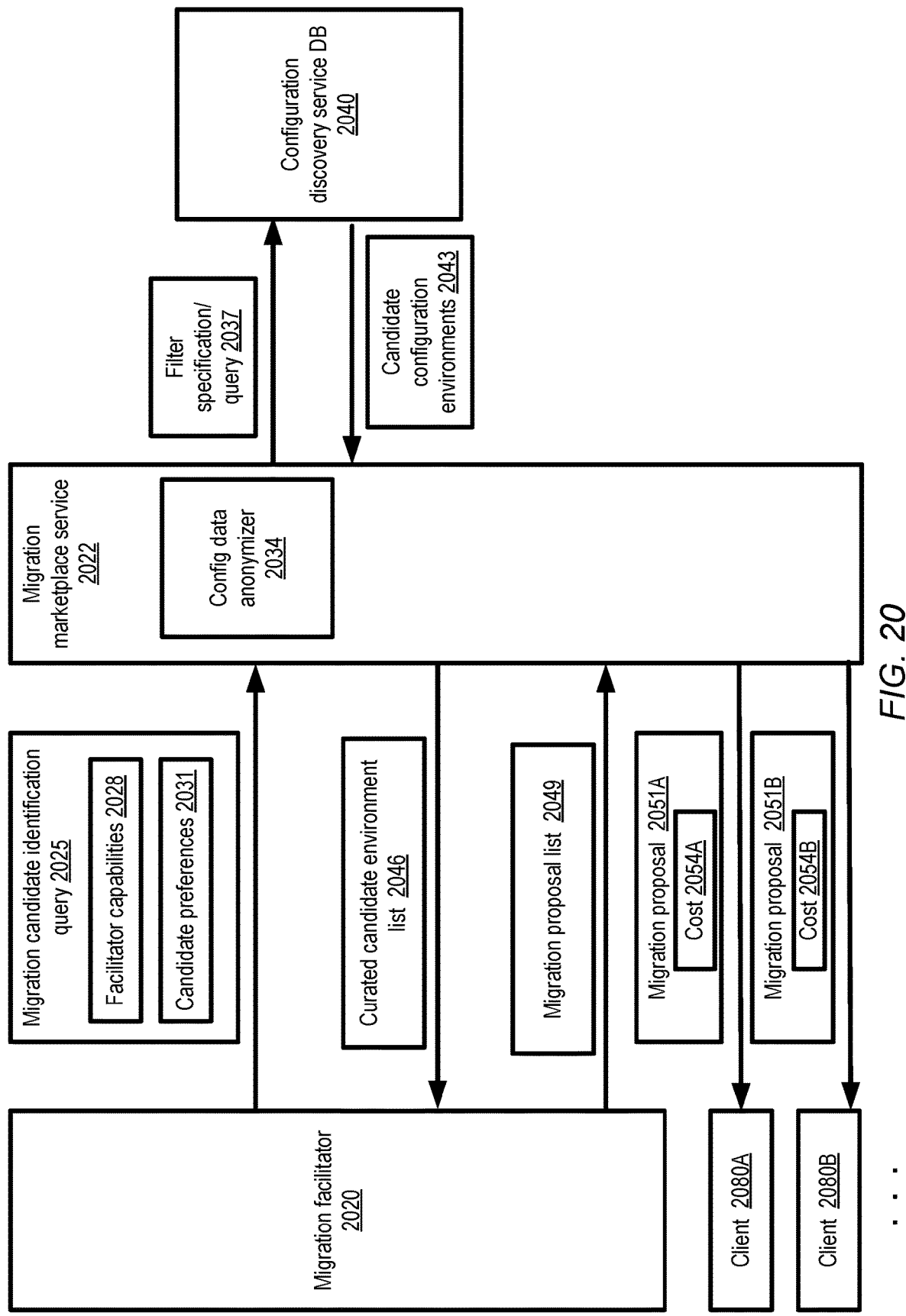
FIG. 20 illustrates a first set of example programmatic interactions between a migration facilitator and a migration marketplace service, according to at least some embodiments.

FIG. 20 illustrates a first set of example programmatic interactions between a migration facilitator and a migration marketplace service, according to at least some embodiments. In the depicted embodiment, a migration facilitator 2020 may submit a migration candidate identification query 2025 to the migration marketplace service 2022 via a programmatic interface. The query 2025 may include respective descriptors of the facilitator's capabilities 2028 (e.g., the types of application for whose migration the facilitator is interested in providing assistance) and candidate preferences 2031 (e.g., the minimum and/or maximum application configuration sizes whose migration the facilitator is willing to assist with, preferred geographical regions or locations from the perspective of the facilitator, and so on).

In response to the candidate identification query 2025, a filter specification 2037 to retrieve matching configuration data from the configuration discovery service database 2040 may be prepared at the migration marketplace service 2022. In some embodiments, a configuration data anonymizer 2034 may participate in the preparation of the filter specification 2037 so that only the subset of configuration data to which access has been granted by potential migration clients via access grant requests of the kind discussed in the context of FIG. 19 is retrieved. In various embodiments, obfuscation criteria (e.g., provided by the potential migration clients, or generated by the migration marketplace service based on heuristics) may be used to prepare the filters to avoid breaches of client configuration security or confidentiality. In one embodiment, instead of or in addition to generating the filter specification, the configuration data anonymizer 2034 may process the configuration data retrieved from the discovery service database to ensure that any security constraints indicated by the potential migration clients are not violated.

A curated candidate environment list 2046, indicating application execution environments and/or clients which match the capabilities and preferences of the migration facilitator 2020 may be transmitted via the service's programmatic interfaces to the facilitator. The facilitator in turn may submit a list 2049 of migration proposals to the service 2022, corresponding to some or all of the candidate environments and clients indicated in list 2046. The migration marketplace service may then transmit representations of the migration proposals 2051 (e.g., 2051A and 2051B) to the appropriate clients 2080 (e.g., 2080A or 2080B) in the depicted embodiment via the service's programmatic interfaces. At least some of the proposals 2051 may include a respective indication of a preliminary cost estimate 2054 (e.g., 2054A or 2054B) for the proposed migration effort in the depicted embodiment. In one embodiment, a proposal 2051 may also or instead include a migration schedule estimate, or a feedback record (e.g., a review or rating/ranking score) indicative of an earlier migration implemented by the facilitator associated with the proposal.

Figure 21:
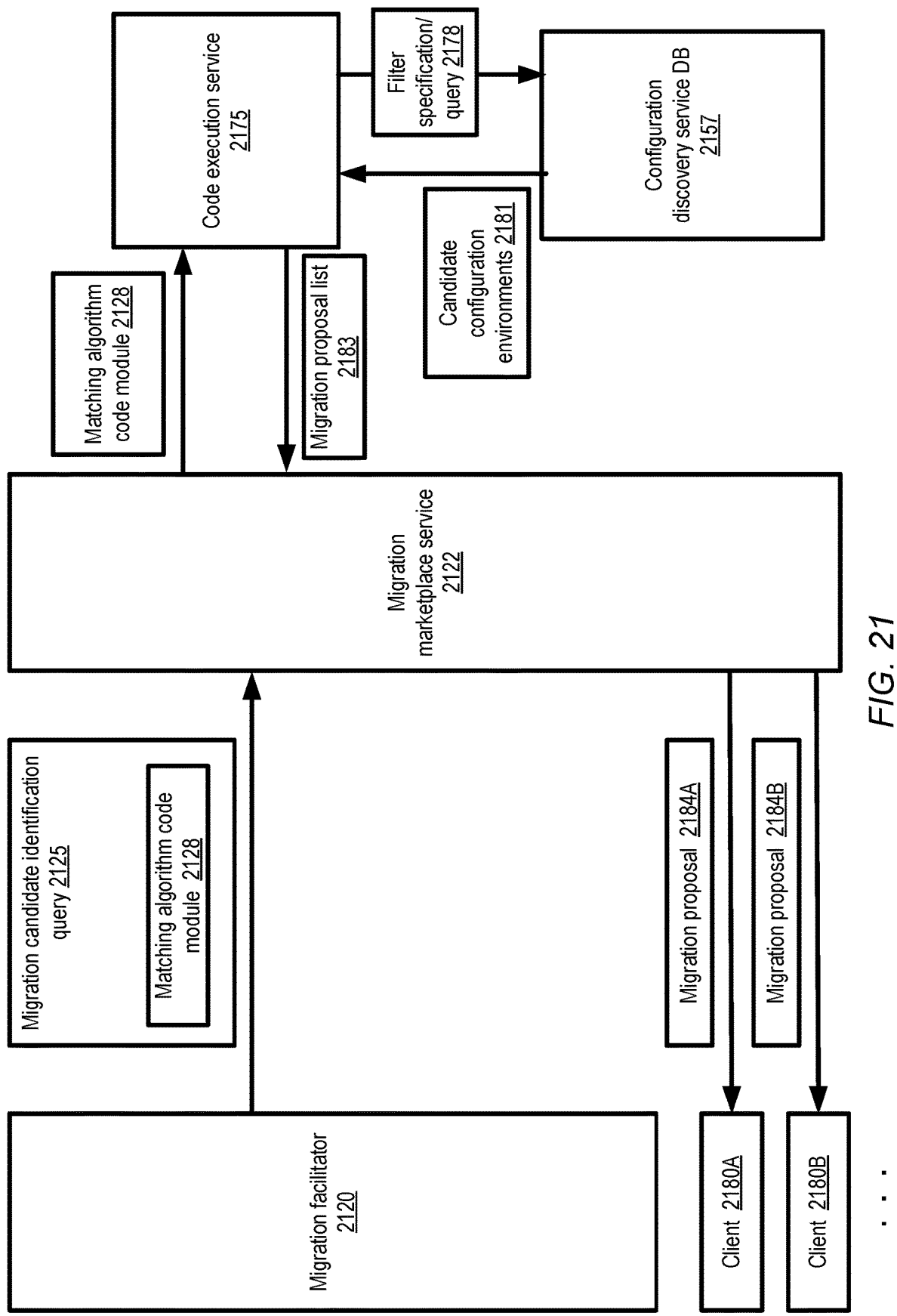
FIG. 21 illustrates a second set of example programmatic interactions between a migration facilitator and a migration marketplace service, according to at least some embodiments.

FIG. 21 illustrates a second set of example programmatic interactions between a migration facilitator and a migration marketplace service, according to at least some embodiments. The primary difference between FIG. 21 and FIG. 20 is that in the scenario illustrated in FIG. 21, the migration facilitator may transmit an executable program code module which can be executed to identify migration candidates which match the facilitator's requirements, instead of relying on the migration marketplace service to use service-generated matching algorithms. Such an approach may, for example, enable the migration facilitators to reduce the amount of detailed information regarding the facilitators' capabilities or constraints that have to be provided to the marketplace service, and may also reduce the burden placed on the marketplace service to develop accurate and efficient matching algorithms.

In the embodiment shown in FIG. 21, a migration facilitator 2120 submits a migration candidate identification query 2125 comprising an indication of an executable candidate-matching algorithm code module 2128 to the migration marketplace service 2122. In some implementations the query 2125 may include some indication of an execution platform or service at which the candidate-matching code module 2128 is to be run. The service 2122 transmits the code 2128 to a selected execution service 2175 (e.g., the packaged-program execution service 1812 of FIG. 18). The use of the packaged-program execution service may have the benefit that no resources may have to be pre-allocated for the migration facilitator; instead, the packaged-program execution service may simply find an available execution platform from among a pool of platforms, run the module on that platform and provide the results of the execution. The migration facilitator may only be responsible for the computation resources actually used for the execution of the module. In some cases, other execution platforms such as virtual machines of the provider network's virtualized computing service may be used.

As a result of the execution of the matching algorithm code, a filter specification 2178 may be transmitted to the configuration discovery service, and a set if matching candidate configuration environments 2181 may be generated accordingly. The matching algorithm code may use the candidate configuration environments to produce a migration proposal list 2183 transmitted to the migration marketplace service. The individual proposals 2184 (e.g., 2184A or 2184B) of the list may then be transmitted to the appropriate clients 2180 (e.g., 2180 or 2180B) in the depicted embodiment.

Marketplace Metadata

Figure 22:
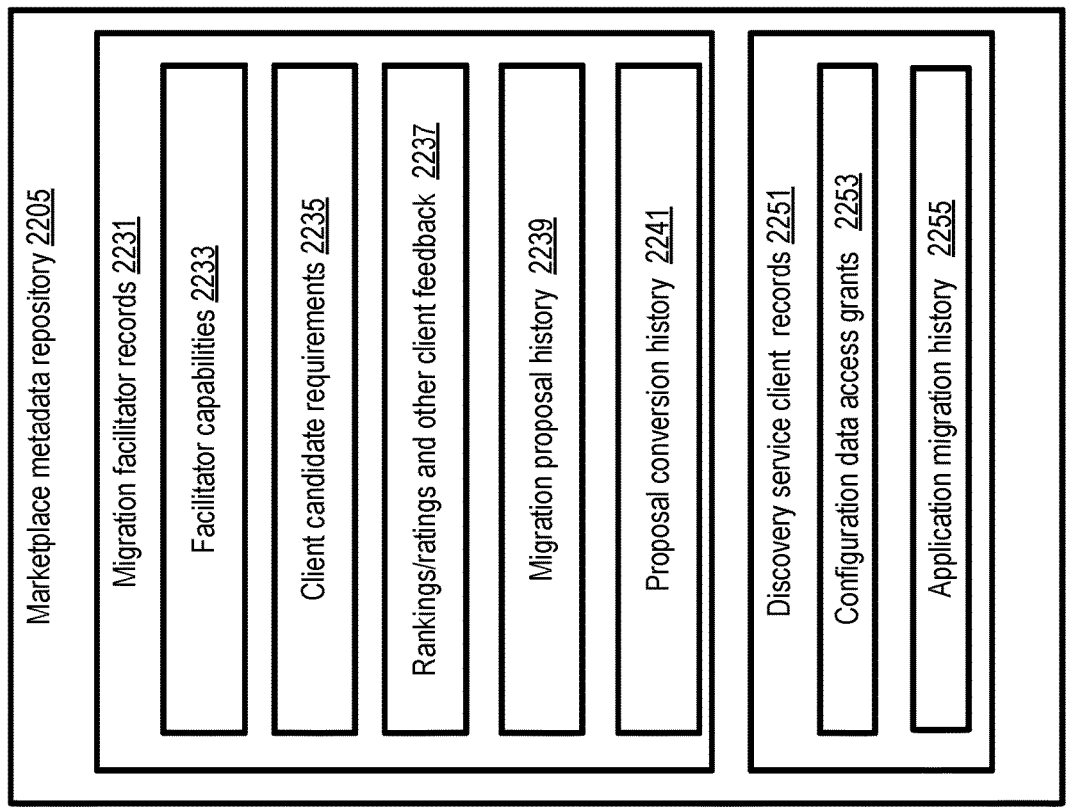
FIG. 22 illustrates examples of entries that may be stored at a metadata repository of a migration marketplace service, according to at least some embodiments.

FIG. 22 illustrates examples of entries that may be stored at a metadata repository of a migration marketplace service, according to at least some embodiments. As shown, the metadata repository 2205 may comprise at least two categories of information: migration facilitator records 2231 and discovery service client records 2251.

The migration facilitator records 2231 may include, for example, descriptors of the facilitators' capabilities 2233 or expertise (e.g., the types of application stacks the facilitators with whose migrations the facilitators have experience). The records 2231 may also include the facilitators' preferences or requirements 2235 regarding the characteristics which make migration candidates suitable for the facilitators (e.g., the geographical distribution of the pre-migration or post-migration configuration items, the range of acceptable or preferred sizes of the to-be-migrated application environments, or preferred geographical regions or locations of operation of the facilitators) in various embodiments. In at least one embodiment the records 2231 may also include feedback 2237 or testimonials indicating the appraisals of the facilitators' earlier assistance. The feedback may include ratings or rankings (e.g., a number of stars between 1 and 5, with 1 indicating a poor rating and 5 indicating an excellent rating) as well as text reviews in some embodiments. In the depicted embodiment, the records 2231 may also include migration proposal histories 2239 (indicating one or more proposals generated by the facilitators in the past) and proposal conversion histories 2241 indicating the subset of the proposals which were accepted by clients.

The discovery service client records 2251 may include the configuration data access grants 2253 corresponding to various clients. In addition, in at least one embodiment, entries 2255 indicating the migration histories of the clients may also be maintained. It is noted that in some embodiments, at least some of the kinds of elements shown in FIG. 22 may not necessarily be stored at the migration marketplace service.

Web-Based Marketplace Service Interface

Figure 23:
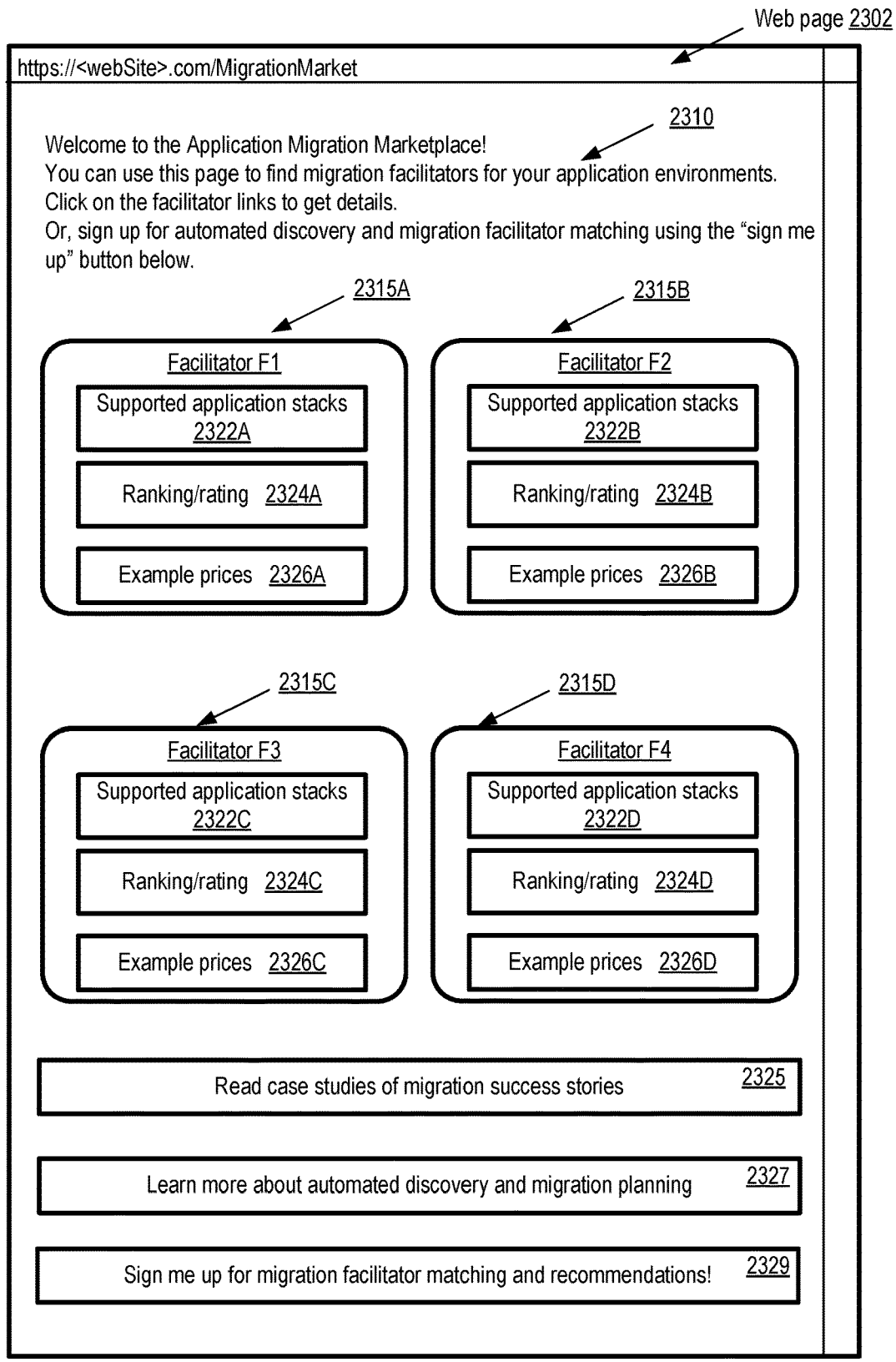
FIG. 23 illustrates an example web-based interface which may be implemented by a migration marketplace service, according to at least some embodiments.

FIG. 23 illustrates an example web-based interface which may be implemented by a migration marketplace service, according to at least some embodiments. As shown, the interface comprises a web page 2302 which includes a message area 2310, some number of advertisement regions 2315 (e.g., 2315A-2315D) corresponding to respective registered migration facilitators, and interaction controls (e.g., buttons or web links) 2325, 2327 and 2329.

The message area 2302 may inform a client of the migration marketplace service that additional information regarding various migration facilitators can be obtained by links indicated in the advertisements. Each of the advertisements may indicate the application stacks that a particular facilitator is willing to assist with—e.g., facilitator F1's supported application stacks 2322A in advertisement region 2315A, facilitator F2's supported application stacks 2322B in advertisement region 2315B, and so on. Ranking/rating feedback 2324 for the facilitators, as well as example pricing information 2325 may also be included in the advertisements in some embodiments.

Case studies indicating the benefits of migrating applications (e.g., to the provider network from customer-owned data centers) may be made available to clients via button control 2325 of the web page 2302. Additional information (e.g., white papers or online tutorials) regarding automated discovery of configuration items and/or migration planning may be accessed via button control 2327. In the depicted embodiment, clients may sign up for recommendations regarding migration facilitators using control 2329. In various embodiments, clients may use the migration marketplace service's interfaces to submit requests for assistance with migration. For example, in some embodiments, clients of the provider network who have not yet started using the discovery service, but may potentially be interested in migrating their applications at some time in the future, may transmit requests via the marketplace service's programmatic interfaces to initiate the automated discovery of configuration items. In response to such a request, the migration marketplace service may invoke the programmatic interfaces of the configuration discovery service on behalf of the client so that the retrieval of configuration information from data sources associated with the client's applications can be begun. The collected information may later be used to match the client with appropriate migration facilitators. In at least one embodiment, a client on whose behalf configuration data has already been collected at a discovery service may submit a migration assistance request to the migration marketplace service. The migration marketplace service may execute its own matching algorithms based on the client's configuration data and the metadata stored regarding facilitators (e.g., in repository 2205 of FIF. 22), and provide facilitator recommendations to the client.

Methods for Supporting a Migration Marketplace

Figure 24:
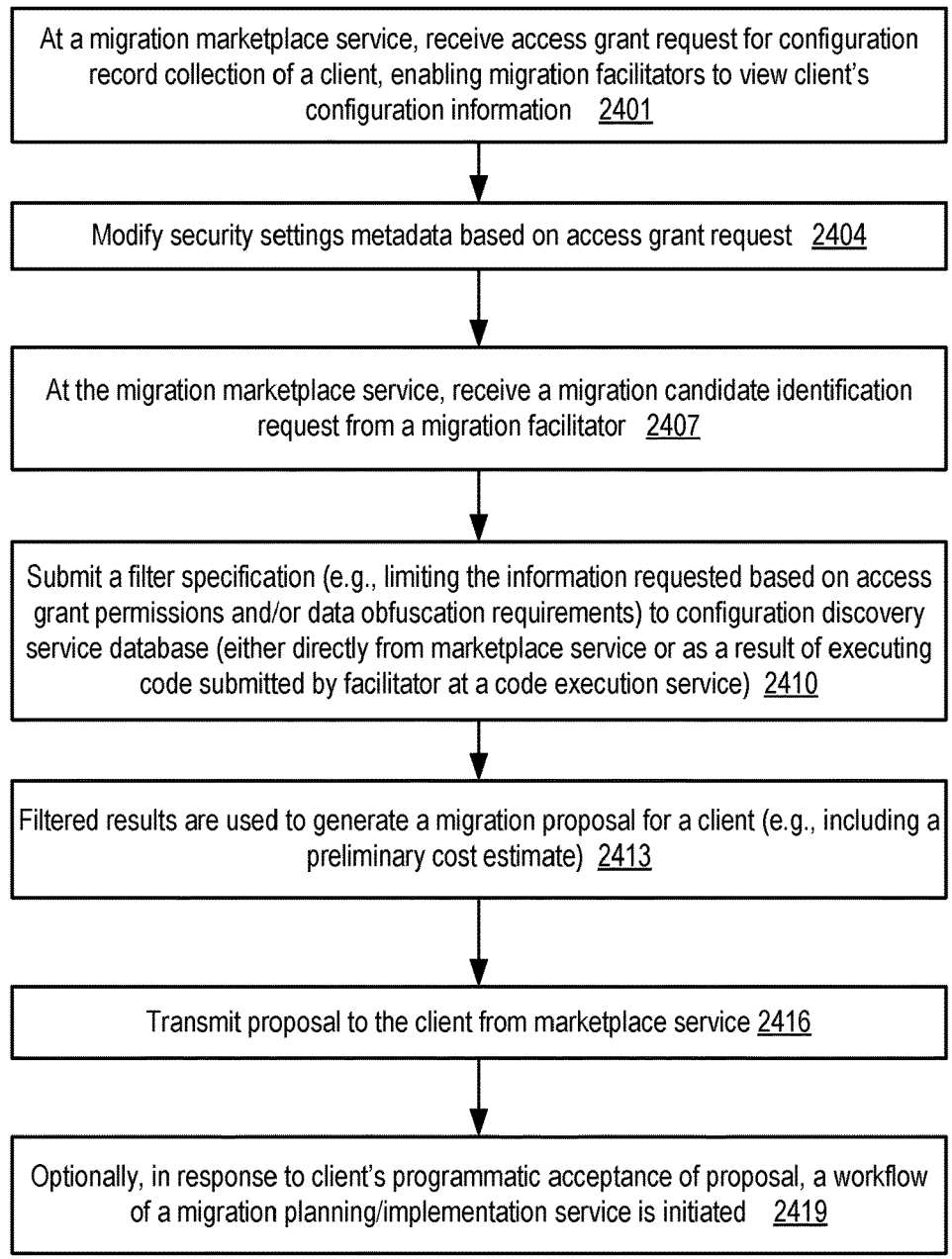
FIG. 24 is a flow diagram illustrating aspects of operations that may be performed at a migration marketplace service, according to at least some embodiments.

FIG. 24 is a flow diagram illustrating aspects of operations that may be performed at a migration marketplace service, according to at least some embodiments. As shown in element 2401, a request to enable migration facilitators to access configuration records of a client's application environments may be received at a migration marketplace service of a provider network. The configuration records may have been collected from a variety of data sources affiliated with a configuration discovery service as described earlier. Security metadata for the configuration record collection of the client may be modified accordingly (element 2404). As mentioned earlier, in some cases the security settings may be modified at the discovery service, while in other embodiments security metadata may be maintained by the migration marketplace service itself.

A migration candidate identification request or query may be received at the marketplace service from a migration facilitator (element 2407). A filter specification or query limiting the configuration data retrieved from a discovery service database based on the client's permission grants and/or data obfuscation requirements may be transmitted to the discovery service (element 2410). In some embodiments, the migration marketplace service may transmit the filter specification or query. In other embodiments, executable code for a migration candidate matching algorithm may be supplied by the migration facilitator, and may be run at a different service of the provider network (such as a packaged-program execution service which does not require pre-allocation of servers for the code), resulting in the submission of the filter specification or query.

The configuration information retrieved in response to the filtering may be used to generate one or more migration proposals (element 2413), e.g., indicating that the migration facilitator is interested in assisting with the migration of a client's execution environment. In at least some embodiments the proposal may include a preliminary cost estimate. The marketplace service may transmit a representation of the proposal via its programmatic interfaces to the client to which the proposal applies (element 2416). Optionally, in response to a client's acceptance of a proposal via a programmatic interface, the migration marketplace service may initiate a workflow of a separate migration planning or implementation service (element 2419).

It is noted that in various embodiments, at least some operations other than those illustrated in the flow diagrams of FIG. 9, FIG. 17, and FIG. 24 may be used to implement the configuration discovery-related and migration marketplace-related techniques described above. Some of the operations shown may not be implemented in some embodiments or may be implemented in a different order, or in parallel rather than sequentially.

Use Cases

The techniques described above, of automated collection, coalescing and visualization of configuration data from a variety of sources at multiple networks, and of implementing migration-related online marketplaces, may be useful in a variety of embodiments. For complex application stacks distributed among customer-owned and provider-owned resources, the described configuration discovery service may be able to combine and curate application configuration data from diverse sources with varying levels of granularity, trust and accuracy. The service may expose the collected data, organized according to a standardized ontology-based naming schema, via easy-to-use programmatic interfaces including APIs that can be used to build higher-level services, such as services that help customers plan and implement the migration of their applications to provider network environments. Visualization components of the configuration discovery service information may make it easier for customers to obtain overviews of their entire application stacks, as well as to drill down into any desired level of detail, which can help with resource capacity planning, debugging performance and troubleshooting. A migration marketplace service may act as an intermediary that can introduce application owners, who may potentially be interested in migrating their applications to provider networks, but may not have the necessary technical expertise to be certain about how to plan and implement the migrations, to migration facilitators or experts that may be able to help the application owners with their migration needs. The migration service may ensure that the information provided regarding a given application environment meets the security criteria of the application owners, and may support a smooth transition to a migration planning and implementation service for customers who have selected a migration facilitator.

Illustrative Computer System

Figure 25:
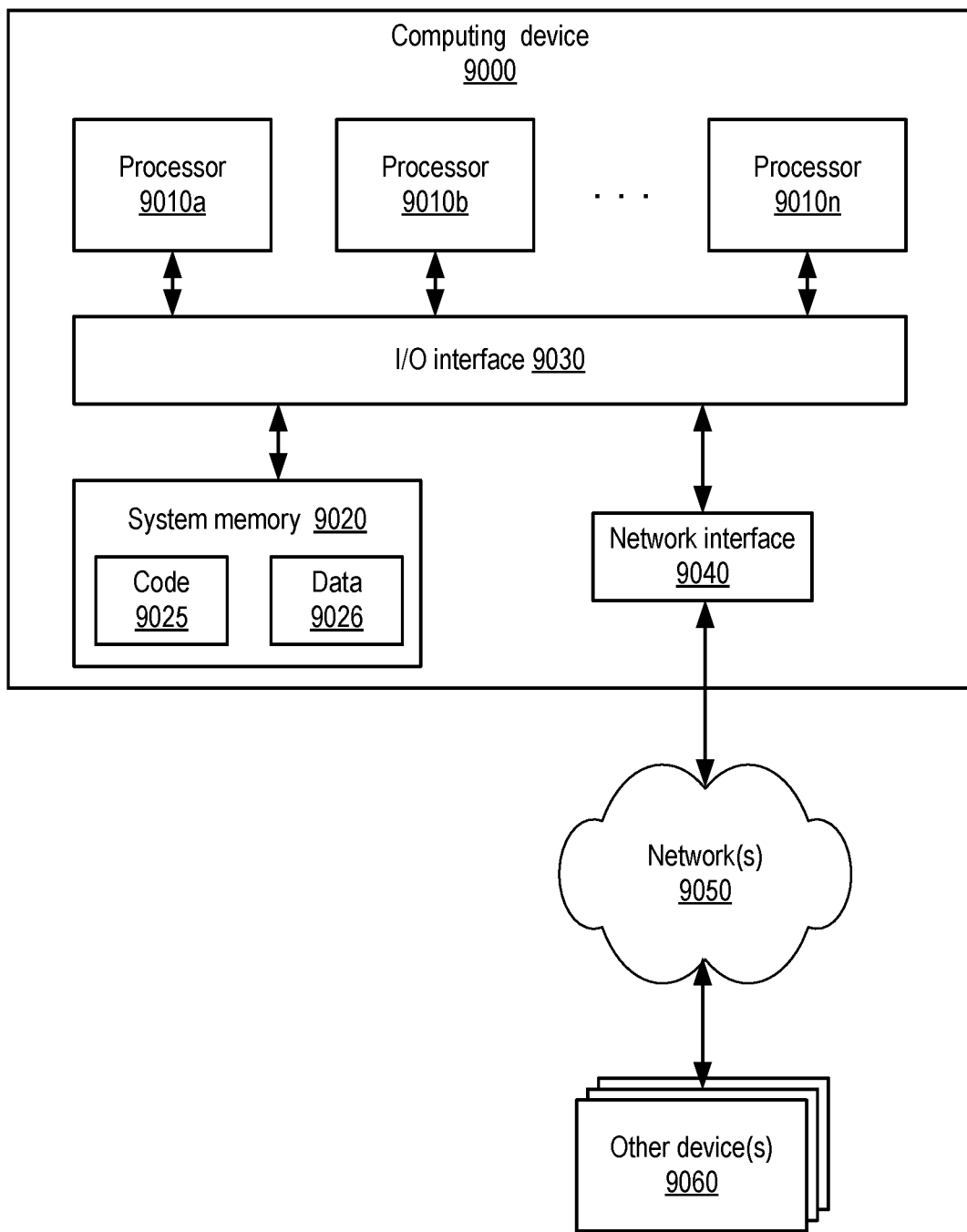
FIG. 25 is a block diagram illustrating an example computing device that may be used in at least some embodiments.

In at least some embodiments, a server that implements a portion or all of one or more of the technologies described herein, including the techniques to implement components of the configuration discovery service, an associated visualization service and/or a migration marketplace service may include a general-purpose computer system that includes or is configured to access one or more computer-accessible media. FIG. 25 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 24, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 24 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 25 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   performing, by one or more computing devices of a resource migration marketplace service:
   receiving, via one or more programmatic interfaces, a first request from a first client to enable access by one or more migration facilitators to a configuration record collection of a first computing environment associated with the first client, wherein the configuration record collection is stored as one of a plurality of configuration record collections of a plurality of computing environments provided by different clients;
   receiving, via the one or more programmatic interfaces, a particular migration candidate identification query from a particular migration facilitator of the one or more migration facilitators, wherein the Particular migration candidate identification query indicates one or more characteristics of candidate computing environments for migration to respective target environments and one or more capabilities of the particular migration facilitator;
   transmitting, via the one or more programmatic interfaces to the particular migration facilitator of the one or more migration facilitators, a response to the particular migration candidate identification query, wherein the response indicates one or more candidate computing environments from the plurality of computing environments that matches the one or more characteristics and the one or more capabilities of the particular migration facilitator, including the first computing environment; and
   providing, to the first client via the one or more programmatic interfaces, an indication of a first proposal associated with migrating, with the assistance of the particular migration facilitator, at least a portion of the first computing environment to a respective target computing environment.

2. The method as recited in claim 1, further comprising performing, by the one or more computing devices:
   constructing, based at least in part on the particular migration candidate identification query, and based at least in part on one or more configuration obfuscation criteria, a filter specification indicating one or more configuration attributes which are to be retrieved from the configuration record collection;
   transmitting a configuration query comprising the filter specification to an automated configuration discovery service at which the configuration record collection is stored; and generating the response to the particular migration candidate identification query based at least in part on a response received from the automated configuration discovery service to the configuration query.

3. The method as recited in claim 1, further comprising performing, by the one or more computing devices:
receiving, via the one or more programmatic interfaces, an indication of an executable candidate-matching module from the particular migration facilitator, wherein the response to the particular migration candidate identification query is based at least in part on a result of executing the candidate-matching module.

4. The method as recited in claim 3, further comprising performing, by the one or more computing devices:
receiving, via the one or more programmatic interfaces from the particular migration facilitator, an indication of a particular compute service of a provider network at which the candidate-matching module is to be executed; and
submitting the candidate-matching module for execution to the particular compute service.

5. The method as recited in claim 1, wherein the first proposal comprises an indication of one or more of: (a) a migration cost estimate, (b) a migration schedule estimate, or (c) a feedback record indicative of an earlier migration implemented by the particular migration facilitator.

6. The method as recited in claim 1, further comprising performing, by the one or more computing devices:
receiving, from a second client via the one or more programmatic interfaces, a rating assigned by the second client to a second migration facilitator, wherein the rating is associated with a particular migration of a second computing environment, wherein the particular migration was performed with the assistance of the second migration facilitator;
storing the rating in a database; and
providing, via the one or more programmatic interfaces, the rating to a third client.

7. The method as recited in claim 1, further comprising performing, by the one or more computing devices:
receiving, from a second client via the one or more programmatic interfaces, a migration assistance request with respect to a second computing environment; and
transmitting, to the second client via the one or more programmatic interfaces in response to the migration assistance request, a recommendation identifying the particular migration facilitator as a candidate for assisting with migration of the second computing environment.

8. The method as recited in claim 1, further comprising performing, by the one or more computing devices:
receiving, from a second client via the one or more programmatic interfaces, an indication that the particular migration facilitator has been approved for a migration of a second computing environment; and
initiating one or more operations to enable the second client to execute a workflow of a migration planning service of a provider network.

9. The method as recited in claim 1, wherein the particular migration candidate identification query comprises an indication of one or more of: (a) an application architecture for which migration is supported by the particular migration facilitator, (b) a minimum size of a source computing environment for which migration is supported by the particular migration facilitator, or (c) a preferred geographical location or region of operation of the particular migration facilitator.

10. The method as recited in claim 1, further comprising performing, by the one or more computing devices:
receiving, via the one or more programmatic interfaces, a request from a second client to initiate the retrieval of configuration information of a second computing environment, wherein an application running at the second computing environment is a candidate for migration to a third computing environment; and
invoking one or more programmatic interfaces of an automated discovery service to initiate the retrieval of the configuration information.

11. A system, comprising:
one or more computing devices of a resource migration marketplace service of a provider network;
wherein the one or more computing devices are configured to:
receive, via one or more programmatic interfaces, a first request from a first client to enable access by one or more migration facilitators to a configuration record collection of a first computing environment associated with the first client, wherein the configuration record collection is one of a plurality of configuration record collections of respective computing environments provided by different clients and stored at a configuration discovery service, and wherein the first computing environment comprises at least one resource outside the provider network;
receive, via the one or more programmatic interfaces, a particular migration candidate identification query from a particular migration facilitator of the one or more migration facilitators, wherein the particular migration candidate identification query indicates one or more characteristics of candidate computing environments for migration to respective target environments and one or more capabilities of the particular migration facilitator;
transmit, via the one or more programmatic interfaces to the particular migration facilitator of the one or more migration facilitators, a response generated at the configuration discovery service to the particular migration candidate identification query, wherein the response indicates one or more candidate computing environments from the plurality of computing environments that matches the one or more characteristics and the one or more capabilities of the particular migration facilitator, including the first computing environment;
receive, from the particular migration facilitator via the one or more programmatic interfaces, an indication of a first proposal associated with migrating at least a portion of the first computing environment to a respective target computing environment, wherein the target computing environment comprises at least one resource of the provider network, and wherein the first proposal includes a preliminary cost metric; and
transmit, via the one or more programmatic interfaces to the first client, respective indications of one or more proposals associated with migrating at least a portion of the first computing environment, wherein the one or more proposals include the first proposal.

12. The system as recited in claim 11, wherein the one or more computing devices are configured to:
construct, based at least in part on the particular migration candidate identification query, and based at least in part on one or more configuration obfuscation criteria, a filter specification indicating one or more configuration attributes which are to be retrieved from the configuration record collection;

transmit a configuration query comprising the filter specification to the configuration discovery service; and generate the response to the particular migration candidate identification query based at least in part on a response received from the configuration discovery service to the configuration query.

13. The system as recited in claim 11, wherein the one or more computing devices are configured to:

receive, via the one or more programmatic interfaces, an indication of an executable candidate-matching module from the particular migration facilitator, wherein the response to the particular migration candidate identification query is based at least in part on a result of executing the candidate-matching module.

14. The system as recited in claim 11, wherein the first proposal comprises an indication of one or more of: (a) a migration cost estimate, (b) a migration schedule estimate, or (c) a feedback record indicative of an earlier migration implemented by the particular migration facilitator.

15. The system as recited in claim 11, wherein the one or more computing devices are configured to:

receive, from a second client via the one or more programmatic interfaces, a rating assigned by the second client to a second migration facilitator, wherein the rating is associated with a particular migration of a second computing environment, wherein the particular migration was performed by the second migration facilitator;

store the rating in a migration facilitator database; and provide, via the one or more programmatic interfaces, the rating to a third client.

16. A non-transitory computer-accessible storage medium storing program instructions that when executed on one or more processors cause the one or more processors to:

determine that a first request from a first client to enable access by one or more migration facilitators to a configuration record collection of the first client has been received, wherein the configuration record collection comprises information associated with a first computing environment of the first client and is stored as one of a plurality of configuration record collections for a plurality of computing environments provided by different clients;

determine that a particular migration candidate identification query has been received via one or more programmatic interfaces from a particular migration facilitator of the one or more migration facilitators, wherein the particular migration candidate identification query indicates one or more characteristics of candidate computing environments for migration to respective target environments and one or more capabilities of the particular migration facilitator;

initiate a transmission, via the one or more programmatic interfaces to the particular migration facilitator of the one or more migration facilitators, of a response to the particular migration candidate identification query, wherein the response indicates one or more candidate computing environments from the plurality of computing environments that matches the one or more characteristics and the one or more capabilities of the particular migration facilitator, including the first computing environment; and cause an indication of a first proposal associated with migrating, with the assistance of the particular migration facilitator, at least a portion of the first computing environment to a respective target computing environment to be provided to the first client via the one or more programmatic interfaces.

17. The non-transitory computer-accessible storage medium as recited in claim 16, wherein the instructions when executed on the one or more processors cause the one or more processors to:

construct, based at least in part on the particular migration candidate identification query, and based at least in part on one or more configuration obfuscation criteria, a filter specification indicating one or more configuration attributes which are to be retrieved from the configuration record collection;

initiate a transmission of a configuration query comprising the filter specification to an automated configuration discovery service at which the configuration record collection is stored; and generate the response to the particular migration candidate identification query based at least in part on a response received from the automated configuration discovery service to the configuration query.

18. The non-transitory computer-accessible storage medium as recited in claim 16, wherein the instructions when executed on the one or more processors cause the one or more processors to:

determine that an indication of an executable candidate-matching module has been received via the one or more programmatic interfaces from the particular migration facilitator, wherein the response to the particular migration candidate identification query is based at least in part on a result of executing the candidate-matching module.

19. The non-transitory computer-accessible storage medium as recited in claim 18, wherein the instructions when executed on the one or more processors cause the one or more processors to:

identify a particular compute service of a provider network at which the candidate-matching module is to be executed; and cause the candidate-matching module to be submitted for execution to the particular compute service.

20. The non-transitory computer-accessible storage medium as recited in claim 16, wherein to cause the indication of the first proposal to be provided to the first client, the instructions when executed on the one or more processors cause the one or more processors to include in the first proposal an indication of one or more of: (a) a migration cost estimate, (b) a migration schedule estimate, or (c) a feedback record indicative of an earlier migration implemented with the assistance of the particular migration facilitator.

21. The non-transitory computer-accessible storage medium as recited in claim 16, wherein to cause the indication of the first proposal to be provided to the first client, the instructions when executed on the one or more processors cause the one or more processors to include in the first proposal an indication of a migration related tool available from the particular migration facilitator, wherein the tool is usable by the first client to migrate the portion of the first computing environment to the target computing environment.

* * * * *